(12) United States Patent
Herring et al.

(10) Patent No.: US 10,961,336 B2
(45) Date of Patent: Mar. 30, 2021

(54) METHOD OF FUNCTIONALIZING FLUOROPOLYMERS WITH ACIDIC SIDE CHAINS EXHIBITING IMPROVED PROPERTIES, THE FLUOROPOLYMERS THEREOF, AND METHODS OF USING

(71) Applicants: Andrew M. Herring, Boulder, CO (US); Mei-Chen Kuo, Denver, CO (US); Andrew R. Motz, Lakewood, CO (US)

(72) Inventors: Andrew M. Herring, Boulder, CO (US); Mei-Chen Kuo, Denver, CO (US); Andrew R. Motz, Lakewood, CO (US)

(73) Assignee: COLORADO SCHOOL OF MINES, Golden, CO (US)

( * ) Notice: Subject to any disclaimer, the term of this patent is extended or adjusted under 35 U.S.C. 154(b) by 19 days.

(21) Appl. No.: 16/113,774

(22) Filed: Aug. 27, 2018

(65) Prior Publication Data

US 2019/0085108 A1 Mar. 21, 2019

Related U.S. Application Data

(60) Provisional application No. 62/628,388, filed on Feb. 9, 2018, provisional application No. 62/550,128, filed on Aug. 25, 2017, provisional application No. 62/548,575, filed on Aug. 22, 2017.

(51) Int. Cl.
| | | |
|---|---|---|
| *C08F 8/40* | (2006.01) | |
| *C08F 214/28* | (2006.01) | |
| *C08F 214/22* | (2006.01) | |
| *C25B 13/08* | (2006.01) | |
| *H01M 8/1039* | (2016.01) | |
| *C08F 8/00* | (2006.01) | |
| *H01M 8/1025* | (2016.01) | |
| *H01M 8/18* | (2006.01) | |

(52) U.S. Cl.
CPC .............. *C08F 214/28* (2013.01); *C08F 8/00* (2013.01); *C08F 8/40* (2013.01); *C08F 214/22* (2013.01); *C25B 13/08* (2013.01); *H01M 8/1025* (2013.01); *H01M 8/1039* (2013.01); *C08F 2810/50* (2013.01); *H01M 8/188* (2013.01); *H01M 2300/0082* (2013.01)

(58) Field of Classification Search
CPC ...... C08F 8/34; C08F 8/36; C08F 8/40; C08F 14/18; C08F 14/22; C08F 14/28; C08F 8/04; C08F 214/18; C08F 214/22; C08F 214/28

See application file for complete search history.

(56) References Cited

U.S. PATENT DOCUMENTS

| 5,242,986 A | 9/1993 | Gibler et al. |
| 5,550,005 A | 8/1996 | Berrier et al. |
| 6,423,784 B1 * | 7/2002 | Hamrock .................. C08F 8/26 |
| | | 525/326.2 |

OTHER PUBLICATIONS

U.S. Appl. No. 16/109,618, filed Aug. 22, 2018, Knauss, et al.
Arges et al., "The Chalkboard: Anion Exchange Membrane Fuel Cells," The Electrochemical Society Interface, vol. 19, No. 2, Summer 2010, pp. 31-35.
Assem et al., "Microwave-Assisted Controlled Ring-Closing Cyclopolymerization of Diallyldimethylammonium Chloride via the RAFT Process," Macromolecular Rapid Communications, vol. 28, No. 18-19, Sep. 2007 pp. 1923-1928, abstract only.
Baker et al., "Cerium Ion Mobility and Diffusivity Rates in Perfluorosulfonic Acid Membranes Measured via Hydrogen Pump Operation," Journal of the Electrochemical Society, vol. 164, No. 12, 2017, pp. F1272-F1278.
Baker et al., "Cerium Migration during PEM Fuel Cell Accelerated Stress Testing," Journal of the Electrochemical Society, vol. 163, No, 9, 2016, pp, F1023-F1031.
Baker et al., "Zr-doped ceria additives for enhanced PEM fuel cell durability and radical scavenger stability," Journal of Materials Chemistry A, vol. 5, No. 29, pp. 15073-15079.
Banham et al., "UV-visible spectroscopy method for screening the chemical stability of potential antioxidants for proton exchange membrane fuel cells," Journal of Power Sources, vol. 281, May 2015, pp. 238-242, abstract only.
Bates et al., "Block Copolymer Thermodynamics: Theory and Experiment," Annual Review of Physical Chemistry, vol. 41, 1990, pp. 525-557.
Bauer et al., "Anion-exchange membranes with improved alkaline stability," Desalination, vol. 79, No. 2-3, Dec. 1990, pp. 125-144, abstract only.
Blinco et al., "Living characteristics of the free-radical ring-closing polymerization of diallyldimethylammonium chloride," European Polymer Journal, vol. 47, No. 1, Jan. 2011, pp. 111-114, abstract only.
Borup et al., "Scientific Aspects of Polymer Electrolyte Fuel Cell Durability and Degradation," Chemical Reviews, vol. 107, No. 10, 2007, pp. 3904-3951.
Brooker et al., "Decreasing Membrane Degradation through Heteropolyacid Sub-layers," Journal of the Electrochemical Society, vol. 160, No, 1, 2013, pp. F75-F80, abstract only.
Bultmann et al., "Competition between Geminate Recombination and Solvation of Polar Radicals following Ultrafast Photodissociation of Bis(p-aminophenyl) Disulfide," Journal of Physical Chemistry, vol. 100, No. 50, 1996, pp. 19417-19424, abstract only.
Butler et al., "Preparation and Polymerization of Unsaturated Quaternary Ammonium Compounds," Journal of the American Chemical Society, vol. 71, No. 9, 1949, pp. 3120-3122, abstract only.
Butler et al., "Preparation and Polymerization of Unsaturated Quaternary Ammonium Compounds. VIII. A Proposed Alternating Intramolecular—Intermolecular Chain Propagation," Journal of the American Chemical Society, vol. 79, No, 12, pp. 3128-3131, abstract only.

(Continued)

*Primary Examiner* — Robert C Boyle
(74) *Attorney, Agent, or Firm* — Sheridan Ross P.C.

(57) ABSTRACT

The invention relates to a method of making fluoropolymers without excessive degradation of the polymer backbone. The invention also relates to the fluoropolymers made by this method, and method of using the fluoropolymers.

18 Claims, 24 Drawing Sheets
(24 of 24 Drawing Sheet(s) Filed in Color)

(56) References Cited

OTHER PUBLICATIONS

Butler, "Cyclopolymerization," Polymer Chemistry, vol. 38, No. 19, Oct. 2000, pp. 3451-3461.
Caire et al., "Mechanical testing of small, thin samples in a humidity-controlled oven," Rheologica Acta, vol. 54, No. 4, Apr. 2014, pp. 253-261, abstract only.
Chen et al., "Dual role study of 12-molybdophosphoric acid on styrene polymerization," Journal of Molecular Catalysis A, vol. 208, No. 1-2, Feb. 2004, pp. 91-95, abstract only.
Cheng et al., "A mini-review on anion exchange membranes for fuel cell applications: Stability issue and addressing strategies," International Journal of Hydrogen Energy, vol. 40, No. 23, Jun. 2015, pp. 7348-7360, abstract only.
Clouet et al., "Free radical synthesis of α, ω-primary amino functionalized polyisoprene through the functional thermal inferter [bis(N-(2-phthalimidoethyl)piperazine)]thiuram disulfide," Macromolecular Chemistry and Physics, vol. 195, No. 1, Jan. 1994, pp. 243-251, abstract only.
Curtin et al., "Advanced materials for improved PEMFC performance and life," Journal of Power Sources, vol. 131, No. 1-2, May 2004, pp. 41-48.
Dang et al., "Alkali-stable and highly anion conducting poly(phenylene oxide)s carrying quaternary piperidinium cations," Journal of Materials Chemistry A, vol. 4, No. 30, 2016, pp. 11924-11938, abstract only.
Destarac et al., "Aqueous MADIX/RAFT polymerization of diallyldimethylammonium chloride: Extension to the synthesis of poly(DADMAC)-based double hydrophilic block copolymers," Journal of Polymer Science A, vol. 48, No. 22, Nov. 2010, pp. 5163-5171, abstract only.
Dizman et al., "Recent advances in the preparation of functionalized polysulfones," Polymer International, vol. 62, 2013, pp. 991-1007, abstract only.
Duncan et al., "Mechanism and Dynamics in the H3[PW12O40]-Catalyzed Selective Epoxidation of Terminal Olefins by H2O2. Formation, Reactivity, and Stability of {PO4[WO(O2)2]4}3-," Journal of the American Chemical Society, vol. 117, No. 2, 1995, pp. 681-691, abstract only.
Ertem et al., "Photo-Cross-Linked Anion Exchange Membranes with Improved Water Management and Conductivity," Macromolecules, vol. 49, No. 1, 2016, pp. 153-161.
Fischer et al., "Poly(diallyldimethylammonium chlorides) and their N-methyl-N-vinylacetamide copolymer-based DNA-polyplexes: role of molecular weight and charge density in complex formation, stability, and in vitro activity," International Journal of Pharmaceutics, vol. 280, No. 1-2, Aug. 2004, pp. 253-269, abstract only.
Ghassemi et al., "Multiblock sulfonated-fluorinated poly(arylene ether)s for a proton exchange membrane fuel cell," Polymer, vol. 47, No. 11, May 2006, pp. 4132-4139, abstract only.
Gu et al., "Base Stable Pyrrolidinium Cations for Alkaline Anion Exchange Membrane Applications," Macromolecules, vol. 47, No. 19, 2014, pp. 6740-6747, abstract only.
Gu et al., "Quaternary Phosphonium-Based Polymers as Hydroxide Exchange Membranes," ChemSusChem, vol. 3, No. 5, May 2010, pp. 555-558, abstract only.
Gubler et al., "Kinetic Simulation of the Chemical Stabilization Mechanism in Fuel Cell Membranes Using Cerium and Manganese Redox Couples," Journal of the Electrochemical Society, vol. 159, No. 2, 2012, pp. B211-B218.
Haugen et al., "The Effect of Heteropoly Acids on Stability of PFSA PEMs under Fuel Cell Operation," Electrochemical and Solid-State Letters, vol. 10, No. 3, 2007, pp. B51-B55, abstract only.
He et al., "Dual-cation comb-shaped anion exchange membranes: Structure, morphology and properties," Journal of Membrane Science, vol. 515, Oct. 2016, pp. 189-195, abstract only.
Herring et al., "Inorganic-Polymer Composite Membranes for Proton Exchange Membrane Fuel Cells," Journal of Macromolecular Science C, vol. 46, No. 3, 2006, pp. 245-296, abstract only.

Hibbs et al., "Synthesis and Characterization of Poly(phenylene)-Based Anion Exchange Membranes for Alkaline Fuel Cells," Macromolecules, vol. 42, No. 21, 2009, pp. 8316-8321, abstract only.
Horan et al., "Cover Picture: Copolymerization of Divinylsilyl-11-silicotungstic Acid with Butyl Acrylate and Hexanediol Diacrylate: Synthesis of a Highly Proton-Conductive Membrane for Fuel-Cell Applications (ChemSusChem Mar. 2009)," ChemSusChem, vol. 2, No. 3, Mar. 2009, p. 193, abstract only.
Horan et al., "Fast Proton Conduction Facilitated by Minimum Water in a Series of Divinylsilyl-11-silicotungstic Acid-co-Butyl Acrylate-co-Hexanediol Diacrylate Polymers," Journal of Physical Chemistry C, vol. 118, No. 1, 2014, pp. 135-144.
Hossain et al., "Comparison of alkaline fuel cell membranes of random & block poly(arylene ether sulfone) copolymers containing tetra quaternary ammonium hydroxides," International Journal of Hydrogen Energy, vol. 39, No, 6, Feb. 2014, pp. 2731-2739, abstract only.
Hugar et al., "Imidazolium Cations with Exceptional Alkaline Stability: A Systematic Study of Structure-Stability Relationships," Journal of the American Chemical Society, vol. 137, 2015, pp. 8730-8737.
James et al., "Hydration of Nafion® studied by AFM and X-ray scattering," Journal of Materials Science, vol. 35, No. 20, Oct. 2000, pp, 5111-5119, abstract only.
Jannasch et al., "Configuring Anion-Exchange Membranes for High Conductivity and Alkaline Stability by Using Cationic Polymers with Tailored Side Chains," Macromolecular Chemistry and Physics, vol. 217, No. 10, May 2016, pp. 1108-1118, abstract only.
Jouannet et al., "Calorimetric study of fluorinated methacrylic and vinyl polymer blends: 1. Binary systems: determination of miscibility domains and correlation of glass transition temperatures with blends composition—application to plastic optical fibre cladding," Polymer, vol. 38, No. 2, Sep. 1997, pp. 5137-5147, abstract only.
Kamata et al., "Efficient Epoxidation of Olefins with ≥99% Selectivity and Use of Hydrogen Peroxide," Science, vol. 300, No. 5621, May 2003, pp. 964-966.
Karibyants et al., "Characterization of PSS/PDADMAC-co-AA Polyelectrolyte Complexes and Their Stoichiometry Using Analytical Ultracentrifugation," Macromolecules, vol. 30, No. 25, 1997, pp. 7803-7809, abstract only.
Kilcher et al., "Role of thiol-disulfide exchange in episulfide polymerization," Journal of Polymer Science A, vol. 46, No. 6, Mar. 2008, pp. 2233-2249, abstract only.
Kim et al., "Synthesis, structure, spectroscopic properties, and hydrolytic chemistry of organophosphonoyl polyoxotungstates of formula [C6H5P(O)]2Xn+W11O39(8−n)-(Xn+=P5+, Si4+)," Inorganic Chemistry, vol. 31, No. 25, 1992, pp. 5316-5324, abstract only.
Klingele et al., "Direct deposition of proton exchange membranes enabling high performance hydrogen fuel cells," Journal of Materials Chemistry A, vol. 3, No. 21, 2015, pp. 11239-11245.
Knauss et al., "Poly(aryl ether sulfide)s by sulfide-activated nucleophilic aromatic substitution polymerization," Polymer, vol. 47, No. 11, May 2006, pp. 3996-4003, abstract only.
Kobayashi et al., "Ring-opening copolymerization of 2,4-bisphenyl-1,3,2,4-dioxadiphosphetane-2,4-dioxide with oxetane via zwitterion intermediates," Polymer bulletin, vol. 16, No. 4, Oct. 1986, pp. 269-276, abstract only.
Kodaira, "Structural control during the cyclopolymerization of unconjugated dienes," Progress in Polymer Science, vol. 25, No. 5, Jun. 2000, pp. 627-676, abstract only.
Kong et al., "Determination of the Structure of a Novel Anion Exchange Fuel Cell Membrane by Solid-State Nuclear Magnetic Resonance Spectroscopy," Macromolecules, vol. 42, No. 5, 2009, pp. 1659-1664, abstract only.
Kongkanand et al., "The Priority and Challenge of High-Power Performance of Low-Platinum Proton-Exchange Membrane Fuel Cells," Journal of Physical Chemistry Letters, vol. 7, No. 7, 2016, pp. 1127-1137, abstract only.
Kundu et al., "Morphological features (defects) in fuel cell membrane electrode assemblies," Journal of Power Sources, vol. 157, No. 2, Jul. 2006, pp. 650-656, abstract only.

(56) References Cited

OTHER PUBLICATIONS

Kusoglu et al., "Electrochemical/Mechanical Coupling in Ion-Conducting Soft Matter," Journal of Physical Chemistry Letters, vol. 6, No. 22, 2015, pp. 4547-4552.
Kusoglu et al., "New Insights into Perfluorinated Sulfonic-Acid Ionomers," Chemical Reviews, vol. 117, No. 3, 2017, pp. 987-1104.
Lalevee et al., "Thiyl Radical Generation in Thiol or Disulfide Containing Photosensitive Systems," Macromolecular Chemistry and Physics, vol. 210, No. 5, Mar. 2009, pp. 311-319, abstract only.
Lancaster et al., "The structure of poly(diallyldimethyl-ammonium) chloride by 13C-NMR spectroscopy," Polymer Letters, vol. 14, No. 9, Sep. 1976, pp. 549-554, abstract only.
Lee et al., "Hydrophilic-Hydrophobic Multiblock Copolymers Based on Poly(arylene ether sulfone) via Low Temperature Coupling Reactions for Proton Exchange Membrane Fuel Cells," Polymer, vol. 49, No. 3, 2008, pp. 715-723.
Lee et al., "Morphological transformation during cross-linking of a highly sulfonated poly(phenylene sulfide nitrile) random copolymer," Energy & Environmental Science, vol. 5, No. 12, 2012, pp. 9795-9802, abstract only.
Leibler, "Theory of Microphase Separation in Block Copolymers," Macromolecules, vol. 13, No. 6, 1980, pp. 1602-1617, first page only.
Li et al., "A new class of highly-conducting polymer electrolyte membranes: Aromatic ABA triblock copolymers," Energy & Environmental Science, vol. 5, No. 1, 2012, pp. 5346-5355.
Li et al., "Poly(2,6-dimethyl-1,4-phenylene oxide) Blended with Poly(vinylbenzyl chloride)-b-polystyrene for the Formation of Anion Exchange Membranes," Macromolecules, vol. 47, No. 19, 2014, pp. 6757-6767, abstract only.
Li et al., "Polyethylene-Based Block Copolymers for Anion Exchange Membranes," Macromolecules, vol. 48, No. 18, 2015, pp. 6523-6533, abstract only.
Li et al., "Synthesis and properties of anion conductive multiblock copolymers containing tetraphenyl methane moieties for fuel cell application," Journal of Membrane Science, vol. 436, Jun. 2013, pp. 202-212, abstract only.
Li et al., "Synthesis and properties of multiblock ionomers containing densely functionalized hydrophilic blocks for anion exchange membranes," Journal of Membrane Science, vol. 467, 2014, pp. 1-12.
Liu et al., "A Small-Angle X-ray Scattering Study of the Development of Morphology in Films Formed from the 3M Perfluorinated Sulfonic Acid Ionomer," Macromolecules, vol. 45, No. 18, 2012, pp. 7495-7503, abstract only.
Liu et al., "Anion exchange membranes composed of a poly(2,6-dimethyl-1,4-phenylene oxide) random copolymer functionalized with a bulky phosphonium cation," Journal of Membrane Science, vol. 506, No. C, 2016, 38 pages.
Liu et al., "Anion Transport in a Chemically Stable, Sterically Bulky α-C Modified Imidazolium Functionalized Anion Exchange Membrane," Journal of Physical Chemistry C, vol. 118, No. 28, 2014, pp. 15136-15145.
Logothetis et al., "Chemistry of fluorocarbon elastomers," Progress in Polymer Science, vol. 14, No. 2, 1989, pp. 251-296, abstract only.
Macomber et al., "Decomposition pathways of an alkaline fuel cell membrane material component via evolved gas analysis," Journal of Thermal Analysis and Calorimetry, vol. 93, No. 1, Jul. 2008, pp. 225-229, abstract only.
Malers et al., "Studies of heteropoly acid/polyvinylidenedifluoride-hexafluoroproylene composite membranes and implication for the use of heteropoly acids as the proton conducting component in a fuel cell membrane," Journal of Power Sources, vol. 172, No. 1, Oct. 2007, pp. 83-88, abstract only.
Marino et al., "Alkaline Stability of Quaternary Ammonium Cations for Alkaline Fuel Cell Membranes and Ionic Liquids," ChemSusChem, vol. 8, No. 3, Feb. 2015, pp. 513-523.
Matsumoto, "Polymerization of multiallyl monomers," Progress in Polymer Science, vol. 26, No. 2, Mar. 2001, pp. 189-257, abstract only.

Maurya et al., "Stability of composite anion exchange membranes with various functional groups and their performance for energy conversion," Journal of Membrane Science, vol. 443, Sep. 2013, pp. 28-35, abstract only.
Mayer et al., "Organic-Inorganic Hybrids Based on Polyoxometalates. 5.1 Synthesis and Structural Characterization of Bis(organophosphoryl)decatungstosilicates [γ-SiW10O36((RPO)2]4-," Inorganic Chemistry, vol. 38, No. 26, 1999, pp. 6152-6158, abstract only.
Meek et al., "Alkaline Chemical Stability and Ion Transport in Polymerized Ionic Liquids with Various Backbones and Cations," Macromolecules, vol. 49, No. 9, 2016, pp. 3382-3394, abstract only.
Meng et al., "Synthesis of macrocyclic aliphatic disulfide oligomers from dithiols by oxidative coupling with oxygen using a copper-amine catalyst," Polymers for Advanced Technologies, vol. 15, No. 9, Sep. 2004, pp. 564-566, abstract only.
Merle et al., "Anion exchange membranes for alkaline fuel cells: A review," Journal of Membrane Science, vol. 377, No. 1-2, Jul. 2011, pp. 1-35.
Morgan et al., "Studies on the Synthesis, Stability and Conformation of 2-Sulfonyl-Oxetane Fragments," Organic & Biomolecular Chemistry, vol. 13, 2015, pp. 5265-5272.
Motz et al., "Synthesis of a Polymer Electrolyte Based on Silicotungstic Acid, Performance, and Mechanical Durability in a Proton Exchange Membrane Fuel Cell," ECS Transactions, vol. 80, No. 8, 2017, pp. 565-570, abstract only.
Nakamura et al., "High-Conductivity Solid Proton Conductors: Dodecamolybdophosphoric Acid and Dodecatungstophosphoric Acid Crystals," Chemistry Letters, vol. 8, No. 1, 1979, pp. 17-18.
Neelakandan et al., "Fabrication and electrochemical properties of surface modified sulfonated poly(vinylidenefluoride-co-hexafluoropropylene) membranes for DMFC application," Solid State Ionics, vol. 268, Pt. A, Dec. 2014, pp. 35-41, abstract only.
Negi et al., "Cyclopolymerization of diallylamine derivatives in dimethyl sulfoxide," Journal of Polymer Science A, vol. 5, No. 8, Aug. 1967, pp. 1951-1965, abstract only.
Nie et al., "Reinvestigation of Photoinitiation Mechanism and Kinetics of Aryl Disulfides," Journal of Photopolymer Science and Technology, vol. 8, No. 1, 1995, pp. 155-162.
Noonan et al., "Phosphonium-Functionalized Polyethylene: A New Class of BaseStable Alkaline Anion Exchange Membranes," Journal of the American Chemical Society, vol. 134, No. 44, 2012, pp. 18161-18164.
Nunez et al., "N-Alkyl Interstitial Spacers and Terminal Pendants Influence the Alkaline Stability of Tetraalkylammonium Cations for Anion Exchange Membrane Fuel Cells," Chemistry of Materials, vol. 28, No. 8, 2016, pp. 2589-2598, abstract only.
Ohma et al., "Membrane Degradation Behavior during Open-Circuit Voltage Hold Test," Journal of the Electrochemical Society, vol. 154, No. 8, 2007, pp. B757-B760, abstract only.
Ohma et al., "Membrane degradation mechanism during open-circuit voltage hold test," Journal of Power Sources, vol. 182, No. 1, Jul. 2008, pp. 39-47, abstract only.
Otsu, "Iniferter concept and living radical polymerization," Journal of Polymer Chemistry, vol. 38, No. 12, Jun. 2000, pp. 2121-2136.
Pandey et al., "A Highly Hydroxide Conductive, Chemically Stable Anion Exchange Membrane, Poly(2,6 dimethyl 1,4 phenylene oxide)-b-Poly(vinyl benzyl trimethyl ammonium), for Electrochemical Applications," Journal of the Electrochemical Society, vol. 163, No. 7, 2016, pp. H513-H520.
Pandey et al., "Insight on Pure vs Air Exposed Hydroxide Ion Conductivity in an Anion Exchange Membrane for Fuel Cell Applications," ECS Transactions, vol. 64, No. 3, 2014, pp. 1195-1200.
Pandey et al., "Interplay between water uptake, ion interactions, and conductivity in an e-beam grafted poly(ethylene-co-tetrafluoroethylene) anion exchange membrane," Physical Chemistry Chemical Physics, vol. 17, No. 6, 2015, pp. 4367-4378.
Pandey et al., "Novel Processing of a Poly(phenyleneoxide)-b-Poly(vinylbenzyltrimethylammonium) Copolymer Anion Exchange Membrane; The Effect on Mechanical and Transport Properties," Electrochimica Acta, vol. 222, 2016, pp. 1545-1554, abstract only.

(56) References Cited

OTHER PUBLICATIONS

Pham et al., "Aromatic Polymers Incorporation Bis-N-spirocyclic Quaternary Ammonium Moieties for Anion-Exchange Membranes," ACS Macro Letters, vol. 4, No. 12, 2015, pp. 1370-1375, abstract only.
Ponce-Gonzalez et al., "High performance aliphatic-heterocyclic benzyl-quaternary ammonium radiation-grafted anion-exchange membranes," Energy and Environmental Science, vol. 9, No. 12, 2016, pp. 3724-3735.
Pribble et al., "Size-Specific Infrared Spectra of Benzene-(H2O)n Clusters (n=1 through 7): Evidence for Noncyclic (H2O)n Structures," Science, vol. 265, No. 5168, Jul. 1994, pp. 75-79, abstract only.
Price et al., "Relationships between Structure and Alkaline Stability of Imidazolium Cations for Fuel Cell Membrane Applications," ACS Macro Letters, vol. 3, No. 2, 2014, pp. 160-165, abstract only.
Pryor et al., "Reactions of Radicals. Rates of Chain Transfer of Disulfides and Peroxides with the Polystyryl Radical," Journal of the American Chemical Society, vol. 84, No. 14, 1962, pp. 2705-2711, first page only.
Ramani et al., "Stabilized heteropolyacid/Nafion® composite membranes for elevated temperature/low relative humidity PEFC operation," Electrochimica Acta, vol. 50, No. 5, Jan. 2005, pp. 1181-1187, abstract only.
Rao et al., "Cando poly(arylene ether sulfone) block copolymers with pendant imidazolium side chains as novel anion exchange membranes for direct methanol alkaline fuel cell," Polymer, vol. 54, No. 26, Dec. 2013, pp. 6918-6928, abstract only.
Refat et al., "Synthesis and spectroscopic characterization of piperidine/I2 charge-transfer complex in different chlorinated organic solvents," Bulgarian Chemical Communications, vol. 43, No. 3, 2010, pp. 439-448.
Robertson et al., "Tunable High Performance Cross-Linked Alkaline Anion Exchange Membranes for Fuel Cell Applications," Journal of the American Chemical Society, vol. 132, No. 10, 2010, pp. 3400-3404, abstract only.
Rocchiccioli-Deltcheff et al., "Vibrational investigations of polyoxometalates. 2. Evidence for anion-anion interactions in molybdenum(VI) and tungsten(VI) compounds related to the Keggin structure," Inorganic Chemistry, vol. 22, No. 2, 1983, pp. 207-216, abstract only.
Sarode et al., "Hydroxide Transport in Next Generation Anion Exchange Membranes," ECS Transactions, vol. 69, No. 17, 2015, pp. 363-367.
Seo et al., "Anion conductive poly(arylene ether sulfone)s containing tetra-quaternary ammonium hydroxide on fluorenyl group for alkaline fuel cell application," Electrochimica Acta, vol. 86, Dec. 2012, pp. 360-365, abstract only.
Shefer et al., "Free-radical telomerization of tert-butyl acrylate in the presence of bis(4-aminophenyl) disulfide as a useful route to amino-terminated telomers of poly(acrylic acid)," Macromolecules, vol. 26, No. 9, 1993, pp. 2240-2245, first page only.
Shi et al., "Synthesis and Proton Conductivity of Partially Sulfonated Poly([vinylidene difluoride-co-hexafluoropropylene]-b-styrene) Block Copolymers," Macromolecules, vol. 38, No. 10, 2005, pp. 4193-4201, abstract only.
Springer et al., "Polymer Electrolyte Fuel Cell Model," Journal of the Electrochemical Society, vol. 138, No. 8, Aug. 1991, pp. 2334-2342.
Stangar et al., "Silicotungstic acid/organically modified silane proton-conducting membranes," Journal of Solid State Electrochemistry, vol. 9, No. 2, Aug. 2004, pp. 106-113.
Starkweather Jr., et al., "Infrared spectra of amorphous and crystalline poly(tetrafluoroethylene)," Macromolecules, vol. 18, No. 9, 1985, pp. 1684-1686, abstract only.
Taguet et al., "Crosslinking of Vinylidene Fluoride-Containing Fluoropolymers," Crosslinking in Materials Science, 2005, vol. 184, pp. 127-211.

Taguet et al., "Grafting of 4-Hydroxybenzenesulfonic Acid onto Commercially Available Poly(VDF-co-HFP) Copolymers for the Preparation of Membranes," Fuel Cells, vol. 6, No. 5, Oct. 2006, pp. 331-339, abstract only.
Taguet et al., "Grafting of commercially available amines bearing aromatic rings onto poly(vinylidene-co-hexafluoropropene) copolymers," Journal of Polymer Science A, vol. 44, No. 6, Mar. 2006, pp. 1855-1868, abstract only.
Tanaka et al., "Anion Conductive Block Poly(arylene ether)s: Synthesis, Properties, and Application in Alkaline Fuel Cells," Journal of the American Chemical Society, vol. 133, No. 27, 2011, pp. 10646-10654, abstract only.
Tang et al., "Mechanical Properties of a Reinforced Composite Polymer Electrolyte Membrane and its Simulated Performance in PEM Fuel Cells," Journal of Power Sources, vol. 175, No. 2, 2008, pp. 817-825.
Tian et al., "A cleaner two-step synthesis of high purity diallyldimethylammonium chloride monomers for flocculant preparation," Journal of Environmental Sciences, vol. 17, No. 5, 2005, pp. 798-801.
Tobolsky et al., "The Reaction between Styrene and Ring Disulfides: Copolymerization Effected by the Chain Transfer Reaction," Journal of the American Chemical Society, vol. 75, No. 7, 1953, pp. 1757-1757.
Topchiev et al., "Some features of dimethyl diallyl ammonium chloride high conversion polymerization in aqueous solutions," European Polymer Journal, vol. 25, No. 11, 1989, pp. 1095-1098, abstract only.
Trogadas et al., "Degradation Mitigation in Polymer Electrolyte Membranes Using Cerium Oxide as a Regenerative Free-Radical Scavenger," Electrochemical and Solid-State Letters, vol. 11, No. 7, 2008, B113-B116.
Tsai et al., "Thermally Cross-Linked Anion Exchange Membranes from Solvent Processable Isoprene Containing Ionomers," Macromolecules, vol. 48, No. 3, 2015, pp. 655-662.
Valade et al., "Preparation of solid alkaline fuel cell binders based on fluorinated poly(diallyldimethylammonium chloride)s [poly(DADMAC)] or poly(chlorotrifluoroethylene-co-DADMAC) copolymers," Journal of Polymer Science A, vol. 47, No. 8, Apr. 2009, pp. 2053-2058, abstract only.
Vandiver et al., "Effect of hydration on the mechanical properties and ion conduction in a polyethylene-b-poly(vinylbenzyl trimethylammonium) anion exchange membrane," Journal of Membrane Science, vol. 497, Jan. 2016, pp. 67-76, abstract only.
Vandiver et al., "Mechanical Characterization of Anion Exchange Membranes by Extensional Rheology under Controlled Hydration," Journal of the Electrochemical Society, vol. 161, No. 10, 2014, pp. H677-H683.
Vandiver et al., "Mechanical Performance of Polyisoprene Copolymer Anion Exchange Membranes by Varying Crosslinking Methods," Journal of the Electrochemical Society, vol. 162, No. 4, 2015, pp. H206-H212.
Varcoe et al., "Anion-exchange membranes in electrochemical energy systems," Energy and Environmental Science, vol. 7, No. 10, 2014, pp. 3135-3191.
Varcoe et al., "Poly(ethylene-co-tetrafluoroethylene)-Derived Radiation-Grafted Anion-Exchange Membrane with Properties Specifically Tailored for Application in Metal-Cation-Free Alkaline Polymer Electrolyte Fuel Cells," Chemistry of Materials, vol. 19, No. 10, 2007, pp. 2686-2693, abstract only.
Varcoe et al., "Prospects for Alkaline Anion-Exchange Membranes in Low Temperature Fuel Cells," Fuel Cells, vol. 5, No. 2, Apr. 2005, pp. 187-200.
Wandrey et al., "Diallyldimethylammonium Chloride and its Polymers," Advances in Polymer Science, vol. 145, 1999, pp. 123-183, abstract only.
Wang et al., "Direct polymerization of sulfonated poly(arylene ether sulfone) random (statistical) copolymers: candidates for new proton exchange membranes," Journal of Membrane Science, vol. 197, No. 1-2, Mar. 2002, pp. 231-242, abstract only.
Webb, "A mild, inexpensive and practical oxidation of sulfides," Tetrahedron Letters, vol. 35, No. 21, May 1994, pp. 3457-3460, abstract only.

(56) References Cited

OTHER PUBLICATIONS

Xing et al., "Synthesis and characterization of sulfonated poly(ether ether ketone) for proton exchange membranes," Journal of Membrane Science, vol. 229, No. 1-2, Feb. 2004, pp. 95-106.

Xu et al., "Fluorene-containing poly(arylene ether sulfone)s as anion exchange membranes for alkaline fuel cells," Journal of Membrane Science, vol. 457, May 2014, pp. 29-38, abstract only.

Xu et al., "Novel anion exchange membrane based on copolymer of methyl methacrylate, vinylbenzyl chloride and ethyl acrylate for alkaline fuel cells," Journal of Membrane Science, vol. 354, No. 1-2, May 2010, pp. 206-211, abstract only.

Yadav et al., "Empirical Correlations to Predict In-situ Durability of Polymer Electrolyte Membranes in Fuel Cells," ECS Transactions, vol. 53, No. 30, 2013, pp. 187-199, abstract only.

Yang et al., "1,2-Dimethylimidazolium-functionalized cross-linked alkaline anion exchange membranes for alkaline direct methanol fuel cells," International Journal of Hydrogen Energy, vol. 40, No. 5, Feb. 2015, pp. 2363-2370, abstract only.

Yang et al., "Poly(2,6-dimethyl-1,4-phenylene oxide)-b-poly(vinylbenzyltrimethylammonium) Diblock Copolymers for Highly Conductive Anion Exchange Membranes," Macromolecules, vol. 48, No. 13, 2015, pp. 4471-4480, abstract only.

Zaton et al., "Current understanding of chemical degradation mechanisms of perfluorosulfonic acid membranes and their mitigation strategies: a review," Sustainable Energy Fuels, vol. 1, No. 3, 2017, pp. 409-438.

Zhang et al., "A New Alkali-Stable Phosphonium Cation Based on Fundamental Understanding of Degradation Mechanisms," ChemSusChem, vol. 9, No. 17, Sep. 2016, pp. 2374-2379, abstract only.

Zhang et al., "Achieving Continuous Anion Transport Domains Using Block Copolymers Containing Phosphonium Cations," Macromolecules, vol. 49, No. 13, 2016, pp. 4714-4722.

Zhang et al., "Anion-Exchange Membranes for Fuel Cells: Synthesis Strategies, Properties and Perspectives," Fuel Cells, vol. 15, No. 6, Dec. 2015, pp. 761-780, abstract only.

Zhang et al., "Tertiary sulfonium as a cationic functional group for hydroxide exchange membranes," RSC Advances, vol. 2, No. 33, 2012, pp. 12683-12685, abstract only.

Zhang, "Synthesis and Characterization of Polymeric Anion Exchange Membranes," University of Massachusetts Amherst Doctoral Dissertation, 2016, abstract only.

Official Action for U.S. Appl. No. 16/113,774, dated Feb. 24, 2020, 8 pages. Restriction Requirement.

Official Action for U.S. Appl. No. 16/113,774, dated May 1, 2020, 9 pages.

Official Action for U.S. Appl. No. 16/150,113, dated Feb. 27, 2020, 8 pages.

Notice of Allowance for U.S. Appl. No. 16/150,113, dated Jun. 19, 2020, 8 pages.

\* cited by examiner

US 10,961,336 B2

METHOD OF FUNCTIONALIZING FLUOROPOLYMERS WITH ACIDIC SIDE CHAINS EXHIBITING IMPROVED PROPERTIES, THE FLUOROPOLYMERS THEREOF, AND METHODS OF USING

CROSS REFERENCE TO RELATED APPLICATION

This application claims the benefit and priority under 35 U.S.C. § 119(e) to U.S. Provisional Patent Application Ser. No. 62/550,128, filed on Aug. 25, 2017, and U.S. Provisional Patent Application Ser. No. 62/628,388, filed on Feb. 9, 2018. Each application is incorporated herein in their entirety by reference.

GOVERNMENT LICENSE RIGHTS

This invention was made with government support under grant numbers DE-EE0006363 and DE-AR0000773 awarded by the U.S. Department of Energy. The government has certain rights in the invention.

FIELD OF THE INVENTION

The present invention relates to functionalizing fluoropolymers without excessive degradation of the polymer backbone, the method of making the same, and method of using the same.

BACKGROUND OF THE INVENTION

Perfluoroelastomers have a wide range of applications as engineering plastics. Their functionalization with acid groups opens up the possibility of them being used as polyelectrolytes in electrochemical cells. Currently, perfluorinated sulfonic acid (PFSA) polymers are the state of the art ion-conducting polymers for many commercial applications, such as fuel cells, electrolyzers and redox flow batteries. Their ion-exchange capacity is limited because the ion containing group is unable to homopolymerize, therefore requiring copolymerization with tetrafluoroethylene (TFE). Furthermore, the molecular weight may be limited by the availability of the TFE molecules. Once all of the TFE molecules are consumed, the reaction will stop. Also, low equivalent weight PFSAs do not form membranes and dissolve in water.

Previous work in U.S. Pat. No. 6,423,784, which is incorporated herein by reference, utilized a commercial fluoroelastomer (FC-2145—tradename 3M™ DYNEON™) which is chemically polyvinylidenediflouride-co-hexaflouropropylene (PVDF-HFP), dissolved in methyl ethyl ketone (MEK), to attach lithium phenoxide. With conventional processes, a base, such as $Li_2CO_3$, NaOH, $KHCO_3$, elevated temperatures are needed to achieve a high degree of functionalization and therefore this reaction was carried out at reflux (ca. 80° C.). The starting fluoroelastomer is strong, but the resultant product is weak due to excessive dehydrofluorination, where the resultant polymer becomes very unsaturated and eventually dehydrofluorination leads to cleavage of the polymer chains.

A wide range of electrochemical energy conversion devices are enabled by proton exchange membranes (PEMs) including fuel cells, electrolyzers, redox flow batteries, and sensors. Fuel cell electric vehicles (FCEV) are already on the market and many more are expected to be released in the next few years. For transportation, FCEVs have several inherent advantages over battery electric vehicles, such as rapid re-fueling (<5 min) and decoupled energy density/ power density. Also, cost does not scale linearly with respect to vehicle range, creating an advantage for FCEVs in markets where longer range is desired. The fuel, which is hydrogen, stores energy in the form of chemical bonds. When oxidized, the product, which is water provides a promising avenue for increased sustainability, decreased carbon emissions, and decreased pollution at the point of use, provided hydrogen comes from renewable resources. Hydrogen is currently produced from natural gas (the most cost effective source), but water electrolysis is rapidly coming down in price.

Water electrolysis will, when coupled with renewable electricity generation, such as wind or solar, provide fully renewable and sustainable hydrogen. While the technology is already advanced enough to commercialize, reducing overall cost, improving durability, and increasing hydrogen availability are still needed for mass adoption of FCEVs. A major current challenge is achieving adequate chemical and mechanical membrane durability while also maintain or even enhancing fuel cell performance.

SUMMARY OF THE INVENTION

The present invention provides a new method of functionalizing fluoroelastomers based on polymers incorporating polyvinylidene difluoride (PVDF) or any polymer with adjacent CH and CF functionalities; 80% of fluoroelastomers are based on the polymerization of vinylidene difluoride ($CF_2$=$CH_2$), i.e., are PVDF or a co-polymer of PVDF. To date, current methods use conventional bases such as $Li_2CO_3$, NaOH, $Na_2CO_3$, $KHCO_3$, etc., which require high temperatures, and result in over dehydroflourination and chain scission of the polymer. In the present invention, the use of a metal hydride such as NaH, KH, $CaH_2$, $MgH_2$, a reactive base instead of a conventional base, to dehydroflourinate the polymer in the presence of a substituted phenol gives rise to a superior material. For example, the material produced in this manner does not have excessive olefinic character due to the hydrogen being produced in-situ, hydrogenating the double bonds, and does not result in chain scission of the polymer leading to weakened polymer structures. The residual double bonds can still be used to cross-link the materials, but in this method their number is controllable. Using a reactive metal hydride base, such as NaH, a high degree of functionalization is also achievable at much lower temperatures. This allows the fluoroelastomer to be functionalized with a large number of functional groups. For polyelectrolytes, insoluble polymers can be achieved that reach much lower equivalent weight (EW) with sulfonic or phosphonic acids. Advantageously, the present invention can also incorporate heteropoly acids (HPAs). HPAs are a large class of super acids, which also may serve as radical decomposition catalysts. It is important to note here that for fuel cells, phosphotungstic acid ($H_3PW_{12}O_{40}$) will decompose in the presence of radicals forming the Ishii-Venturello catalyst, whereas silicotungstic acid ($H_4SiW_{12}O_{40}$) is known to be stable under similar conditions.

An aspect of the present invention takes high molecular weight materials and is able to attach acid containing side chains. Surprisingly, the new material is able to stay water insoluble with greater degree of functionalization than could be achieved before. Utilizing these new groups, further chemical modification can result in a conductive, strong, and durable film containing covalently attached acid groups such as phosphonic, sulfonic or silicotungstic acid. This material can reduce manufacturing costs compared to PFSAs and offer a simple way to crosslink the material, reduce swelling, increase selectivity for small molecules, and improve chemical stability to radical attack. Additionally, an aspect of the present invention is a material produced with sufficient conductivity at elevated temperatures (ca. about 140° C. to about 180° C.) to be competitive with polybenzimidazole (PBI)/phosphoric acid fuel cells, but with less challenges on start-up or shut down because the acid is stable to liquid water.

An aspect of the present invention relates to a method of making a functionalized fluoropolymer, comprising mixing an aromatic molecule, wherein the aromatic molecule has substituent X selected from one of the substituents in FIG. 2, and an aprotic solvent at between about −10° C. to about 10° C. to form a mixture. 1.5 molar equivalents of NaH, LiH, KH, or $CaH_2$ are added to the mixture to form a second mixture. The second mixture is allowed to react for at least about an hour to convert the aromatic molecule to an aromatic alkoxide and hydrogen gas. Hydrogen gas and the aromatic alkoxide reacts with the polymer or the hydrogen gas is removed from the second mixture to produce the aromatic oxide. The aromatic oxide and the fluoroelastomer form the functionalized fluoropolymer. Optionally, post chemical attachment modification of X into Z can occur, where the functional groups illustrated in FIG. 2.

In an embodiment of the present invention, the method can further comprise heating the mixture of alkoxide and fluoroelastomer to a temperature between about 40° C. and about 60° C. In some embodiments, the second mixture does not include $Li_2CO_3$. The method can further comprise soaking the functionalized fluoropolymer in sulfuric acid at between about 25° C. and about 50° C. for between about 24 hours and about 7 days. In some embodiments, the aromatic molecule can be a phenol or diethyl (4-hydroxyphenyl) phosphonate (DHPP). In some embodiments, the aprotic solvent can be methylethylketone (MEK). The fluoroelastomer can be a fluoroelastomer wherein a CH group is adjacent to a CF group. Non-limiting examples of suitable fluoroelastomers includes, but are not limited to, PVDF or copolymers of PVDF with a number of other monomers such as hexafluoropropylene PVDF-HFP with >15 mol % HFP, PVDF-HFP with >5 mol % HFP, known by the trade names VITON®, FLUOREL®, or DYNEON®, and combinations thereof, tetrafluoroethylene, etc. In some embodiments, the method can further comprises chemically modifying the functionalized fluoropolymer with an HPA. The base can be a metal hydroxide, for example NaH.

An aspect of the invention is a method to functionalize a phosphonic acid. The method includes mixing DHPP and about 1.5M NaH in MEK to form a first material. The first material is mixed with about 0.5 molar equivalents of NaH and a fluoropolymer dissolved in a ketone at about 0° C. for about 1 hour to form a first mixture. The first mixture is reacted at about 50° C. for about 16 hours to form a functionalized phosphonic acid. The ketone can be MEK.

An aspect of the invention is a functionalized fluoropolymer:

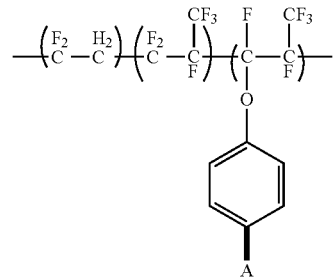

wherein A is

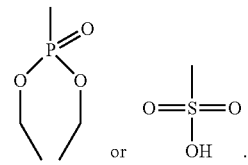

The polymer can be further functionalized with an HPA. The HPA can be $[\alpha\text{-}SiW_{10}O_{36}]^{-8}$ (SiW10) or $[SiW_{11}O_{39}]^{-4}$ (SiW11). The polymer can be used in a device selected from the group consisting of a fuel cell, an electrolyzer, a redox flow battery, a electrochemical reactor, a sensor, and combinations thereof. The polymer can be an additive in the device that acts as a particle in catalyst layers, as a barrier layer, or as a protective layer, or combinations thereof.

An aspect of the invention is a method of making a functionalized fluoropolymer. The method includes mixing an aromatic molecule with an aprotic solvent to form a mixture. A reactive base is added to the mixture to form a second mixture. The aromatic molecule of the second mixture is converted to an aromatic alkoxide and hydrogen gas. The aromatic oxide and the fluoroelastomer are mixed to form the functionalized fluoropolymer. Hydrogen gas can react with the fluoroelastomer to hydrogenate the olefins in the polymer backbone.

An aspect of the invention is a method to produce a polyHPA. The method includes preparing a polyPPE. The polyPPE is mixed with a silane to form a polyPPA. The polyPPA is mixed with a solvent to form a polyHPA.

An aspect of the invention is a functionalized fluoropolymer. The functionalized fluoropolymer is depicted below:

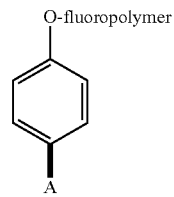

wherein at least 80-100% of the fluoropolymer includes an original molecular weight of the fluoropolymer, and no more than 10-50% excess olefinic character. "A" is a substituent from FIG. 2.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
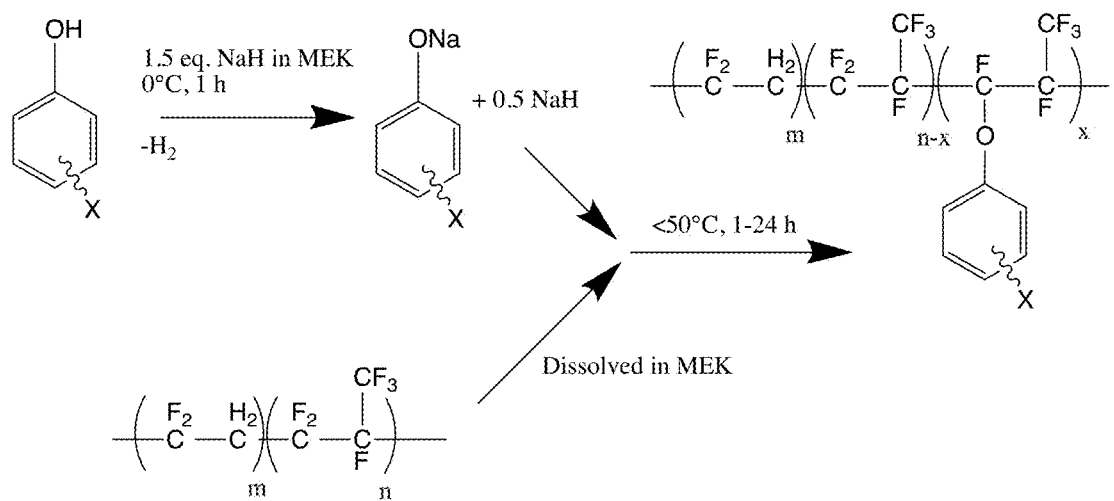
FIG. 1 illustrates the method of forming the polymer of the present invention.

An aspect of the invention is a method of making a functionalized fluoropolymer. The method includes mixing an aromatic molecule with an aprotic solvent to form a mixture. The aromatic molecule can have a substituent. A reactive base is added to the mixture to form a second mixture. The aromatic molecule of the second mixture is converted to an aromatic oxide and hydrogen gas. At least a portion of the hydrogen gas is removed from the reaction the remainder reacts with the polymer. The aromatic oxide and the fluoroelastomer are mixed to form the functionalized fluoropolymer.

The aromatic molecule can be phenol, DHPP, Chloro-, bromo-, or iodo-phenol. The aprotic solvent can be any suitable solvent wherein the solvent does not react with the reactive base. Suitable aprotic solvents include, but are not limited to, MEK, dimethylacetamide (DMAc), dimethyl sulfoxide (DMSO), or dimethylformamide (DMF) and combinations thereof. In some embodiments, the aprotic solvent can be a second solvent selected from the group consisting of methanol or ethanol. The ratio of the aromatic molecule to the aprotic solvent can be between about 5 g:100 ml and about 25 g:100 ml. The substituent of the aromatic molecule can depend on the end polymer; thus, it would be impossible to provide a full list of potential substituents of the aromatic molecule. However, one skilled in the art would understand other substituents that could be included based on the invention. In some embodiments, the substituent can be selected from the groups set forth in FIG. 2. The base can be, for example, NaH, LiH, KH or $CaH_2$, or combinations thereof. The concentration of the base can be between about 0.01M and about 10M. The ratio of the base to the first mixture can be between about 1:10 and about 1:10,000. In some embodiments, about 1.5 molar equivalents of the base are added to the mixture.

The aromatic molecule can be mixed with the aprotic solvent at a temperature between about −70° C. and about 25° C., in some embodiments between about −10° C. and about 10° C., for between about 30 minutes and about 24 hours. A base can be added to the mixture at a temperature between about −70° C. and about 25° C. for between about 30 minutes and about 6 hours. The reaction to convert the aromatic molecule of the second mixture to an aromatic oxide and hydrogen gas can occur at a temperature between about −70° C. and about 25° C. for between about 30 minutes and about 24 hours. The aromatic oxide and the fluoroelastomer are mixed a temperature between about −10° C. and about 30° C., in some embodiments between about 40° C. and about 60° C., for between about 30 minutes and about 24 hours.

The base and the mixture react to form an aromatic oxide and hydrogen gas. At least a portion of the hydrogen gas is removed from the reaction. In some embodiments, 100 vol. % of the hydrogen gas can be removed from the reaction. In some embodiments, the hydrogen gas can react with the polymer to hydronated olefins in the polymer backbone.

A fluoroelastomer can be mixed with the aromatic oxide to form the functionalized fluoropolymer. The fluoroelastomer can include any co-polymer of vinylidienedifluoride including with hexafluropropylene (VDF-HFP), PVDF-HFP with >15 mol % HFP, PVDF-HFP with >5 mol % HFP, VITON®, FLUOREL®, and DYNEON®, the 3M FC-XXXX polymer group and combinations thereof. The fluoroelastomer can attach to the oxide of the aromatic oxide. The ratio of the fluoroelastomer to the aromatic oxide in the mixture can be between about 1:1 and about 1:100.

An advantage of the present invention is that the second mixture does not include $Li_2CO_3$, sodium or potassium carbonate or other common bases such as NaOH, KOH, or sodium, potassium or lithium bicarbonate. This advantage allows for the amount of dehydroflourination to be controlled and disabling chain scission.

Figure 5:
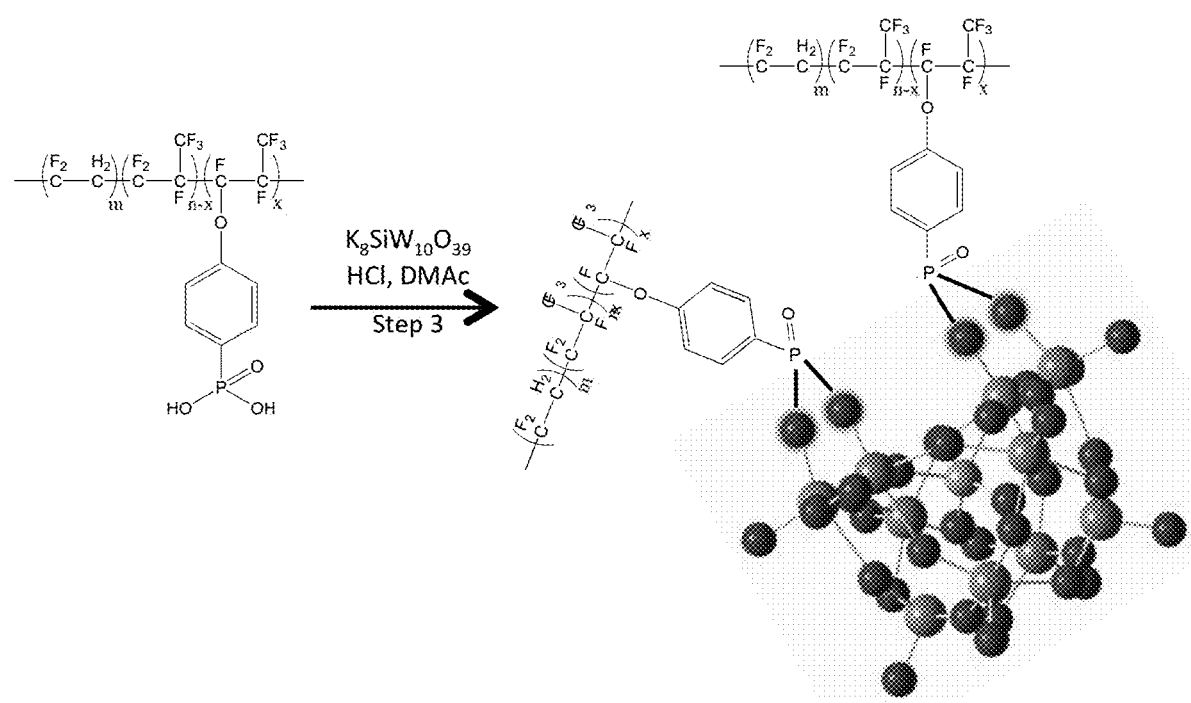
FIG. 5 illustrates a specific example for the attachment of SiW10.

In some embodiments, the substituent can be substituted after the functionalized fluoropolymer is formed. A substituted substituent can be at least one of SiW10, SiW11, $[PW_{10}O_{36}]^{-8}$ (PW10) or $[PW_{11}O_{39}]^{-4}$(PW11), or their molybdenum analogues. The substituted substituent, an acid and a solvent are combined with the functionalized fluoropolymer. The ratio of the substituted substituent to the acid to the solvent to the functionalized fluoropolymer is between about 10:5:100:10 and about 20:10:200:50. The reaction can occur at a temperature between about 25° C. and about 100° C. for between about 30 minutes and about 24 hours. The resulting polymer comprises the substituted substituent. The percent yield can be up to about 95%, in some embodiments between about 70% and about 95%. FIG. 5 illustrates an embodiment of the invention where SiW10 has been attached to the polymer.

The functionalized fluoropolymer can be pretreated based on its end use. For example, a fluoropolymer that will be used in a battery can be soaked in an acid to pretreat the material. Other materials, where the material must be neutral can be rinsed with water to neutralize the material. In some embodiments, the functionalized fluoropolymer can be soaked in an acid at a temperature between about 25° C. and about 50° C., for between about 1 hour and about 24 hours and could also be soaked in deionized (DI) water for one to three times under the same conditions. Soaking the functionalized fluoropolymer in the acid can exchange the functional group to the acid form (i.e. "X" from FIG. 1). The acid can be sulfuric acid, hydrochloric acid, or nitric acid. The method of claim 1, further comprising soaking the functionalized fluoropolymer in sulfuric acid at between about 25° C. and about 50° C. for between about 24 hours and about 7 days.

In some embodiments, the polymer can be incorporated into a composite. The composite can be with a particle in a catalyst layer, with a barrier layer, or with a protective layer, and combinations thereof. In some embodiments, the polymer can be incorporated into an ink and applied to a membrane.

An aspect of the present invention relates to a method to attach large numbers of functional units to fluoropolymers without excessive degradation of polymer backbone. The method results in an ionomer that is capable of reaching high ion exchange capacity and remaining stable to boiling water. In addition, the polymer is synthesized, then ionic units can be added, which allows for easier access to high molecular weight materials. The polymer can be functionalized with an aromatic group containing a hydroxy group via conversion to an alkoxide and subsequent nucleophilic substitution. This attachment can then be followed by subsequent chemical modification or by direct attachment of a functional group. The polymer can also be functionalized with hydrocarbons and fluorocarbons containing a hydroxyl group.

A perfluorinated polymer, e.g., the 3M fluoroelastomer FC-2178, can be functionalized by attachment of phenol molecules using low temperature and NaH as a base. The NaH acts as both a base for converting the phenol into the corresponding phenoxide and a base to dehydrofluorinate the polymer. In contrast, using the original methods described in U.S. Pat. No. 6,423,784, which is incorporated by reference in its entirety, the material becomes less stable to water and loses mechanical properties. This method of the present invention is a significant improvement over previous methods.

This drastic difference is caused by over dehydrofluorination which causes increased unsaturated bonds in the polymer backbone which are likely susceptible to chemical degradation and loss of mechanical strength, and/or the molecular weight getting reduced by chain cleavage in the reactions.

The material of the present invention has the same amount of side chain attachment as materials made with the old method, but the mechanical strength is much better. Additionally, the ion transport in the material of the present invention is easier.

The present invention relates to a chemical process of attaching small molecules to fluoroelastomers and which can further include phenol phosphonic acid containing side chains that can subsequently be used to attach heteropoly acids, and in addition to sulfonate side chains (sulfonated before or after attachment). Additionally, this material can be cross-linked using a bifunctional molecule and the same reaction.

An aspect of the invention is a method to make the fluoropolymer. The method includes adding phenol to MEK between about 25° C. and about 100° C., in some embodiments about 0° C., then adding between about 0.5 molar equivalents and about 5 molar equivalents of NaH, in some embodiments about 1.5 molar equivalent of NaH. The materials are allowed to react for about one hour to convert the phenol to phenoxide and hydrogen gas. The hydrogen gas is removed from the reaction leaving the phenoxide and a portion of the NaH, between about 0.1 molar equivalents and about 5 molar equivalents, in some embodiments about 0.5 molar equivalents of NaH. Next, the fluoroelastomer (already in solution) can be added to the reaction. Each base is able to create two double bonds. The phenoxide is able to attach to the unsaturated bond. After about several hours, the reaction can be heated to about 50° C. to ensure greater extend of reaction. Advantageously, using low temperature and NaH, rather than $Li_2CO_3$ leads to much improved performance.

Figure 2:
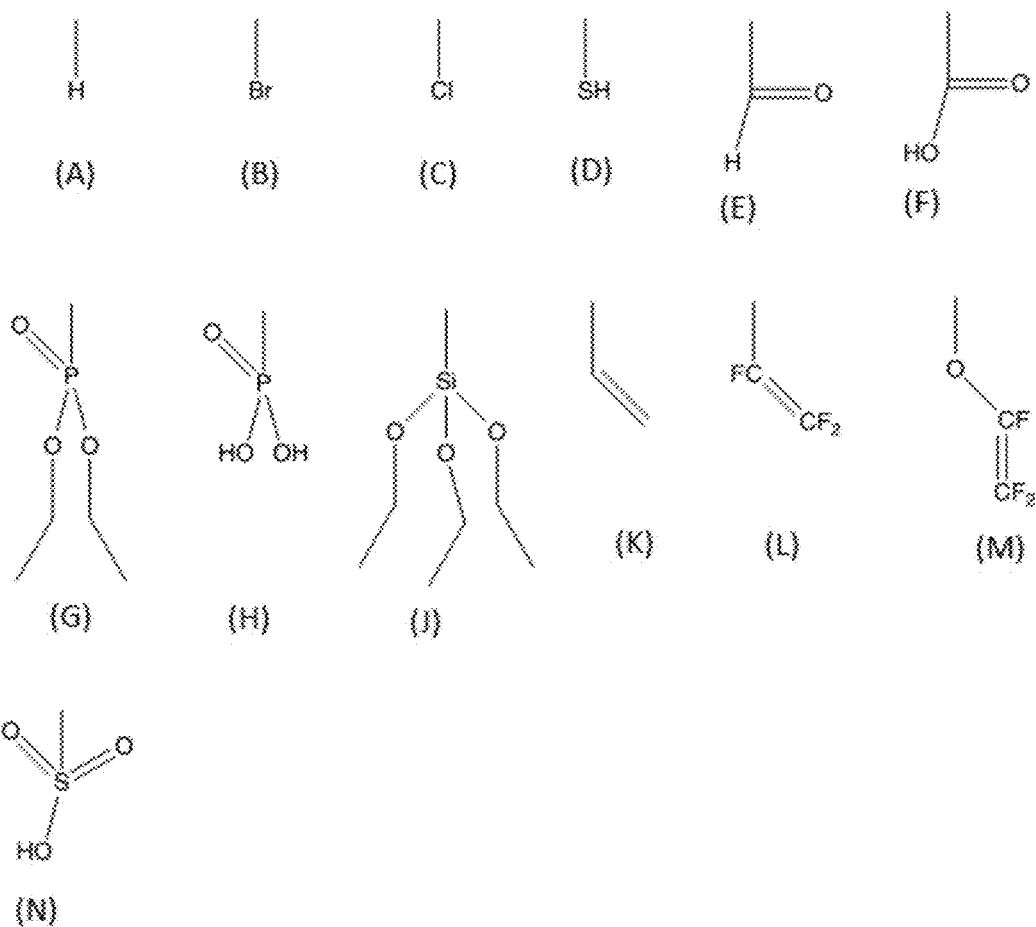
FIG. 2 illustrates potential substituents used with the invention as "X" as illustrated in FIG. 1.
Figure 3:
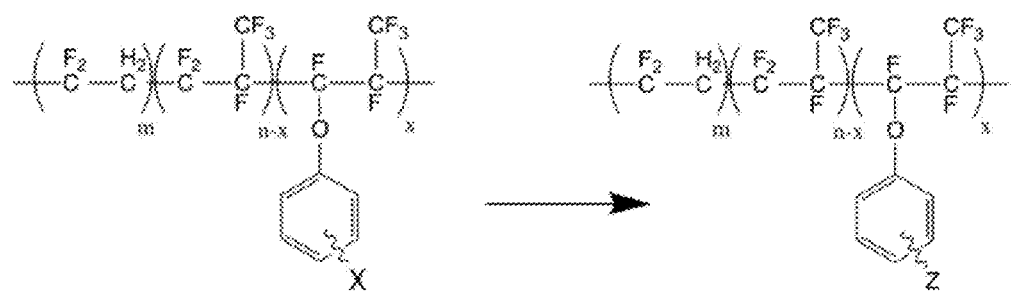
FIG. 3 illustrates post attachment chemical modification of "Y" converting it to "Z", wherein "Y" is a subset of the functional groups "X" above in FIG. 2.

While the specific examples discuss using phenol or diethyl-4-hydroxyphenyl phosphonate (DHPP) to attach to fluoropolymer (FC-2178), should not be limited to one single fluoroelastomer or just the two example attachment molecules. FC-2178 has the chemical makeup of vinylidienefluoridehexafluropropylene (VDF-HFP). VDF-HFPs are often referred to as FKM polymers and different formulations and molecular weight polymers are sold under trade names VITON®, FLUOREL®, and DYNEON®, just to name a few and the embodiment of this invention should be understood to pertain to each of these different fluoroelastomers as well as others. Additionally, several different functional groups, for example, an ion-conducting group and a crosslinking moiety, can be attached to serve multiple purposes. FIG. 2 illustrates substituents ("X") that can be included on the phenol. The purpose for these groups can be for crosslinking, other reaction, or ion transport. One reaction of particular interest is attaching heteropoly acids. A specific example would be sulfonation wherein X=H and Z=$SO_3H_2$ which can be accomplished through immersion in fuming sulfuric acid.

Figure 4:
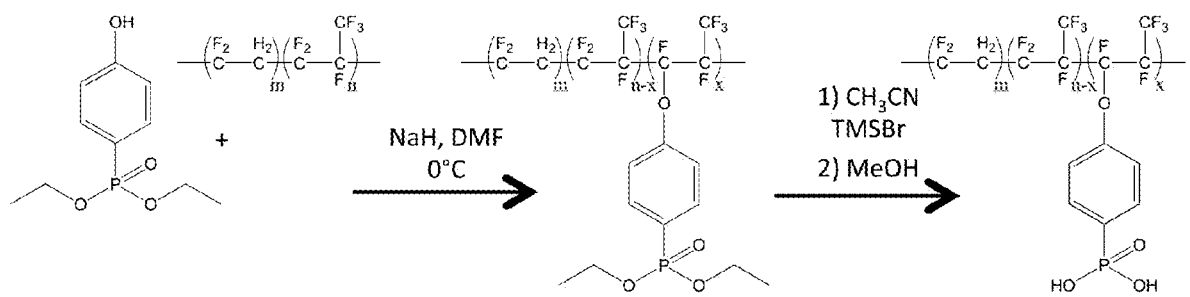
FIG. 4 illustrates a specific process which starts off with the attachment of DHPP to the polymer.

FIG. 4 illustrates a specific process which starts off with the attachment of DHPP to the polymer as outlined in FIG. 1 and conversion to a phenol phosphonic acid (i.e. X=PO($OCH_2CH_3$)$_2$ and Z=PO(OH)$_2$). This reaction can proceed as set forth in FIG. 1 to attach DHPP to the fluoroelastomer, followed by dissolving the polymer in acetonitrile and the addition of about 4 eq. of bromotrimethylsilane per side chain. Next, the mixture can react at about 45° C. before the reaction is quenched with about 4 eq HCl and methanol. The product can be filtered, dried, and soaked in water.

An aspect of the invention is a method to produce a polyHPA. The method includes preparing a polyPPE. The polyPPE is then mixed with a silane to form a polyPPA, which is them mixed with a HSiW11 or other lacunary HPA to form a polyHPA.

The silane can be bromotrimethylsilane (TMSBr) or chloromethyl silane. The polyPPE can be mixed with silane in an inert environment. The gas of the inert environment can be nitrogen, argon, or helium.

An aspect of the invention is a functionalized fluoropolymer. The functionalized fluoropolymer is in the form of

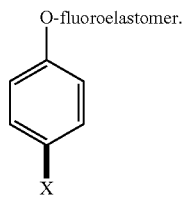

where X can be a substituent from FIG. 2. In some embodiments, the fluoroelastomer can be any co-polymer of vinylidene difluoride with any other monomer, for example hexafluropropylene (VDF-HFP), PVDF-HFP with >15 mol % HFP, PVDF-HFP with >5 mol % HFP, VITON®, FLUOREL®, and DYNEON®, the 3M FC-xxxx polymer group, and combinations thereof such as tetrafluoroethylene.

In some embodiments, the polymer can be further functionalized with an HPA. The HPA can be Siw10, SiW11, PW10 or PW11. In some embodiments, the polymer comprises between about 20 wt. % and about 85 wt. % of the HPA.

The polymer can be incorporated into a device. The device can be a fuel cell, an electrolyzer, a membrane, a redox flow battery, sensor a photochromic or a electrochemical membrane reactor. The device can be used for energy, conversion of chemical or sensing.

An aspect of the invention is a membrane comprising polyHPA. The membrane comprises between about 80 wt. % and about 25 wt. % of a polymer and the balance being the HPA. Incidental materials can be included, which can be up to about 10 wt. % of the membrane.

A chemical shift can occur at least one of 23, 20.5, 15.1, and 9.5 ppm for the polyHPA. The polyHPA can have a loss between about 15 wt. % per ° C. and about 80 wt. % per ° C. of at a temperature of between 280 and 400° C. In some embodiments, the material can include at least one inflection point. In some embodiments, an inflection point can occur between about 200° C. and about 600° C. when in an oxidizing environment (for example in air) or between about 100° C. and about 500° C. In some embodiments, the first inflection point can be about 420° C. In some embodiments, the second inflection point can occur at a temperature of about 490° C. in an oxidizing environment. In some embodiments, the PVDF-HFP can have a thermal decomposition temperature between about 450° C. and about 550° C. In some embodiments, the thermal decomposition temperature can be about 450° C. in nitrogen gas. In some embodiments, the HPA can cluster forming at least one cluster having at least one dimension between about 1 nm and about 100 nms. In some embodiments, the proton conductivities of the polyHPA can be between about 228 mS/cm and 298 mS/cm when the polyHPA comprises between about 70 wt. % and 75 wt. % of the HPA.

A product from such a reaction can then be used to covalently attach a heteropoly acid, i.e., dilacunary silicotungstic acid SiW10, which is illustrated in FIG. 5. The phenol phosphonic acid functionalized fluoroelastomer is dissolved in a solvent with SiW10, then HCl is added to facilitate the covalent attachment of SiW10. The process outlined in FIG. 5 illustrates a specific example for the attachment of SiW10, but this same process can occur with monolacunary silicotungstic acid $[\alpha\text{-}SiW_{10}O_{36}]^{-8}$ and mono- or di-lacunary phosphotungstic acid $[\alpha\text{-}PW_{10}O_{36}]^{-7}$ and $[\gamma\text{-}PW_{10}O_{36}]^{-7}$, respectively. Additionally, the silane analogue can be used in this reaction outlined in FIG. 5 where X or Y=$Si(OCH_2CH_3)_3$.

There are several advantages of the present invention. The method of producing the membrane comprises three steps. The membrane is chemically durable and robust, thin and conductive. Furthermore, the method of using the invention results in a lower in-situ transport resistance and vastly greater chemically stability than the state of the art polymer electrolyte.

EXAMPLES

Example 1

Preparation of PolyPPE

A fluoroelastomer, PVDF-HFP, FC-2178 (31.78 g) was cut in to small pieces and washed with methanol (around 300 mL), dried at 40° C. under vacuum for two days, then dissolved in 320 mL of anhydrous DMF. In a separate flask, 21.0 g (98% pure, 0.0866 mol, 1 equiv.) of DHPP (diethyl (4-hydroxyphenyl)phosphonate) was added to 50 mL of anhydrous DMF and allowed to dissolve at room temperature, followed by cooling to 0° C. Sodium hydride (NaH, 60% suspension in oil, 4.68 g) was stirred with hexanes and the quickly filtered before use. Once cooled, NaH (100%, 2.81 g, 0.117 mol, 1.35 equiv.) was added slowly to the DHPP solution over a period of 15 minutes, under a ultra high purity $N_{2(g)}$ flow, producing $H_{2(g)}$ bubbles. After 2 h at 0° C., bubble formation subsided and the FC-2178 solution was slowly added over a period of 30 minutes at 0° C. The combined solution was then heated to 50° C. and allowed to react for 24 h, darkening with time, before precipitation in 1M HCl (2500 mL) The brown precipitate was then isolated, washed with water until ca. 6 on pH testing paper, and dried under vacuum for 48 h at 40° C. producing phenol phosphonic ester functionalized PVDF-HFP FC-2178 (PolyPPE) (Yield: 85.6%)

Preparation of PolyPPA

The PolyPPE was then dissolved in 450 mL acetonitrile overnight at room temperature. The following day, 32 mL bromotrimethylsilane (TMSBr) was added under a nitrogen gas environment. The reaction was heated to 45° C. and allowed to react overnight, producing a cloudy mixture. The reaction solution was filtered, and the filtrate was dissolved in 600 mL MeOH with 20 mL concentrated HCl, quenching the reaction. The solution was filtered, and the filtrate was allowed to dry at room temperature, producing a brown film. The film was subsequently washed with water, dried, and stored at room temperature, producing the cleaned phenol phosphonic acid functionalized fluoroelastomer (PolyPPA). The yield was about 38.5 g (77%).

Preparation of PolyHPA

About 4.50 g PolyPPA was added to 180 mL DMAc and allowed to dissolve overnight at 80° C. Next, 10.50 g $\alpha$-$K_8SiW_{11}O_{39}$·13($H_2O$), synthesized according to the protocol previously reported in D. C. Duncan, R. C. Chambers, E. Hecht and C. L. Hill, *Journal of the American Chemical Society*, 1995, 117, 681-691, which is incorporated by reference in its entirety, was slowly added. The mixture was cloudy, but rapid stirring with a magnetic stir bar ensured no precipitate formed on the bottom. Next, 12M HCl (1.356 mL) was added dropwise, turning the solution into a transparent amber. The reaction took place over 70 h at 80° C., then the solution was filtered with a paper filter followed by a glass filter. The volume was then reduced to ca. 60 mL using a rotary evaporator. This solution was then cast on Kapton and dried at room temperature overnight, followed by thermal annealing under pressure (5 min, 6000 lbf, 160° C.). The resulting film was then soaked in 1M $H_2SO_4$ to ion-exchange (3×) followed by 3× rinse in DI water.

Synthesis

Figure 6:
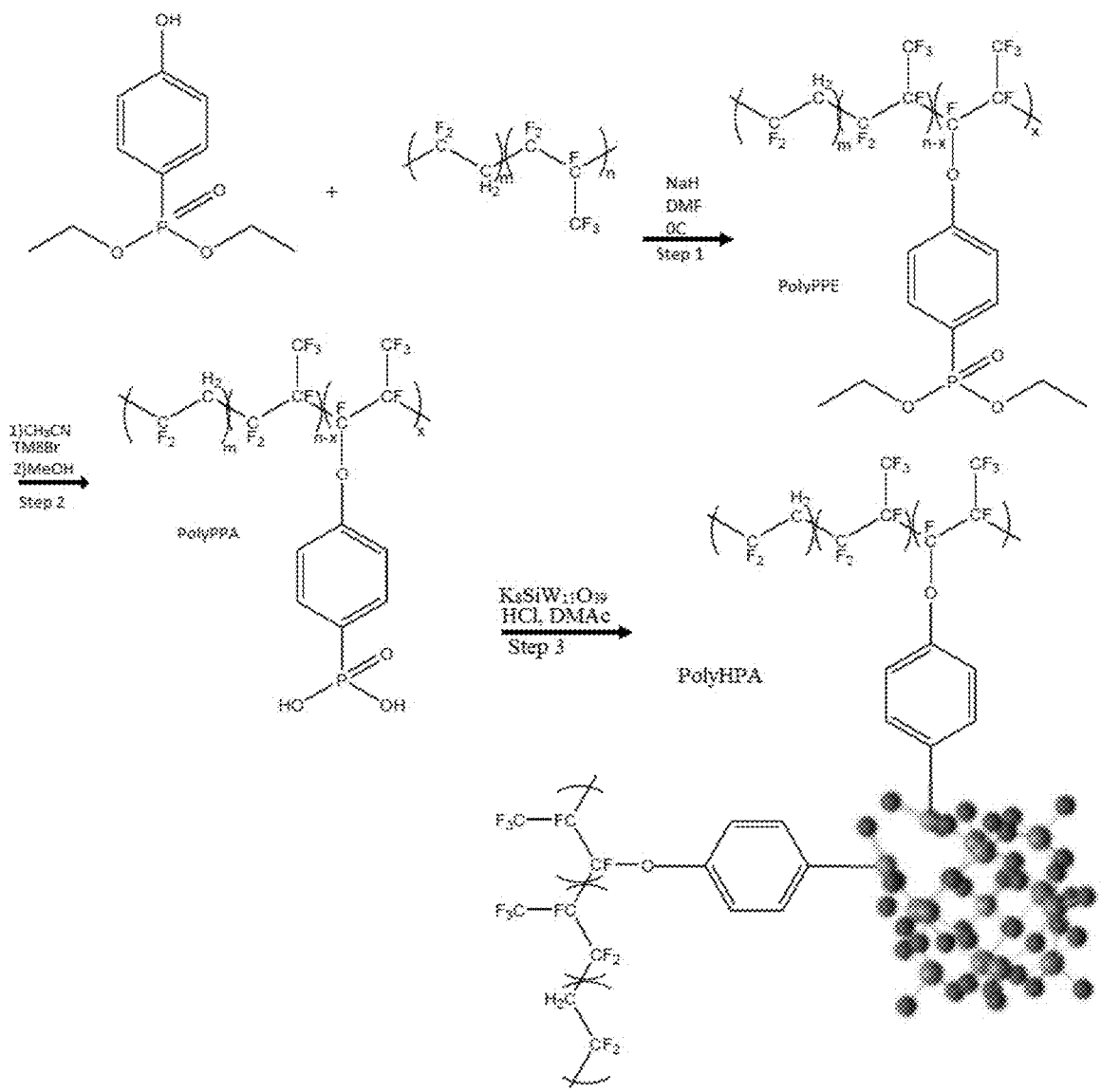
FIG. 6 illustrates the full synthetic reaction scheme illustrated in Example 1.

A four-step synthesis has previously been reported and was used to covalently attach monolacunary silicotungstic acid (HSiW) to a poly(vinylidene fluoride-co-hexafluoropropylene) (PVDF-HFP) fluoroelastomer (FC-2178, 3M). This original synthesis method involved attachment of diethyl (4-hydroxyphenyl)phosphonate (DHPP) sidechains to FC-2178 utilizing $K_2CO_3$ as a reactant. The $K_2CO_3$ can ion-exchange with the alcohol to form an alkoxide (—O—$K^+$) and potassium bicarbonate ($KHCO_3$). Both alkoxide and $K_2CO_3$ are then able to dehydrofluorinate the FC-2178, creating unsaturated bonds, and enabling attachment of the alkoxide. Because $K_2CO_3$ is a poor nucleophile, it will not attach to the polymer and only the alkoxide will become covalently attached. This chemistry is based on methods that have been used to cross-link PVDF-HFP. The reaction resulted in excessive unsaturated bonds remaining in the final product and the films had extremely poor mechanical properties. To avoid the over dehydrofluorination, the reagent was changed to NaH, as the hydride is a stronger base than $K_2CO_3$, but still a weak nucleophile. This change allows for attachment of DHPP at much lower temperatures. The resulting PolyPPA (product of step 3, illustrated in FIG. 6), a transparent yellow film, was much lighter in color than the PolyPPA made using $K_2CO_3$, which was almost black. The work described here was done using the much stronger PolyPPA produced via. the process outlined in FIG. 6. The method for functionalizing lacunary heteropoly acids with small organic molecules has been well documented, for example in C. R. Mayer, P. Herson and R. Thouvenot, *Inorganic Chemistry*, 1999, 38, 6152-6158, or G. S. Kim, K. S. Hagen and C. L. Hill, *Inorganic Chemistry*, 1992, 31, 5316-5324, which are incorporated by reference in their entirety, but this work involves attaching HSiW to preformed engineering polymer chosen for its strength and stability. Attachment of HSiW to a preformed polymer has not been previously reported.

The final product is referred to as PolyHPA-x where x indicates the theoretical wt % HSiW loading. A majority of the studies were done on PolyHPA-70 and some data exist for the higher loading material, PolyHPA-75.

All films were thoroughly washed in acid followed by water showing that the HSiW moiety was indeed covalently attached.

Example 2

Preparation of PolyPhenylfluoroelastomer

Clean PVDF-HFP, FC-2178 (15.02 g) was dissolved in 150 mL of anhydrous dimethylformamide (DMF). In a 250 mL three-neck round bottom flask, 21.0 g (3.75 g, 0.04 mol, 1 equiv.) of phenol was added to 25 mL of anhydrous DMF and allowed to dissolve at room temperature, followed by cooling to 0° C. Sodium hydride (NaH, 60% suspension in oil, 2.148 g) was stirred with hexanes and the quickly filtered before use. Once cooled, NaH (100%, 1.2888 g, 0.0537 mol, 1.35 equiv) was added slowly to the phenol solution over a period of 10 minutes, under a UHP N2(g) flow, producing H2(g) bubbles. After 2 h at 0° C., bubble formation subsided and the FC-2178 solution was slowly added over a period of 15 minutes at 0° C. The combined solution was then heated to 50° C. and allowed to react for 24 h, darkening with time, before precipitation in 1M HCl (1000 mL) The brown precipitate is then isolated, washed with DI water until ca.

pH6 on pH testing paper, and dried under vacuum for 48 h at 40° C. producing phenol functionalized FC-2178 (Yield: 17.35 g, 96.6%)

Preparation of PolyPhenlsulfonic Acid, PolyPSA

Phenol functionalized PVDF-HFP from above (0.75 g) was dissolved in dimethylacetamide (DMAc, 8 mL). The polymer solution was cashed on the Teflon sheet and evaporated the solvent under snorkel for three days. These membranes were peeled from the Teflon sheet and soaked in the sulfuric acid, fuming (reagent grade, 20% free $SO_3$ basis, 10 mL) for two days at room temperature. These membranes were wash with DI water until ca. pH6 on pH testing paper, and dried under snorkel for two days.

Characterization

Fourier Transform Infrared Spectroscopy (FT-IR).

FT-IR was collected using a Nicolet Nexus 470 FT-IR E.S.P equipped with a Specac Golden Gate attenuated total reflection (ATR) stage at ambient conditions. All spectra were collected with 512 scans and a resolution of 1 $cm^{-1}$.

NMR

Liquid NMR spectrum were recorded on a Joel ECA 500 MHz spectrometer in DMSO-d6 solvent. The chemical shifts for $^1H$, $^{19}F$, $^{31}P$ were based on tetramethylsilane, trichlorofluoromethane, and phosphoric acid standards, respectively. The solid state $^1H\rightarrow{}^{31}P$ CP/MAS measurements were performed on a 400 MHz Bruker spectrometer using triphenylphosphine (−6 ppm) as a standard.

Focused Ion-Beam (FIB) Milling and Transmission Electron Microscopy (TEM)

The sample was milled with Gallium ions using a Helios NanoLab 600i focused ion beam and placed on a TEM grid. The transmission electron microscopy (TEM) was performed using a FEI TalosF200X.

Small Angle X-Ray Scattering (SAXS)

The SAXS data was collected on beamline 12-ID-B at the Advanced Photon Source, Argonne National Lab in a custom-built environmental chamber, using 13.3 keV radiation. The chamber, described in detail in Y. Liu, J. L. Horan, G. J. Schlichting, B. R. Caire, M. W. Liberatore, S. J. Hamrock, G. M. Haugen, M. A. Yandrasits, S. n. Seifert and A. M. Herring, *Macromolecules*, 2012, 45, 7495-7503, which is incorporated by reference in its entirety, is able to control temperature and humidity and the conditions are outlined below. A Pilatus 3M detector was used.

Thermogravimetric Analysis (TGA)

TGA experiments were performed using a TA instruments TGA Q 500 using a platinum pan. The ramp rate was 5° C. per minute up to 800° C. with a gas flow rate of 40 mL/min. Experiments were ran using $N_2$ or air.

Differential Scanning Calorimetry (DSC)

The DSC data was collected on a TA instruments DCS Q20 in TZero aluminum pans with hermetic lids. The heating scan rate was 10° C./min and the cooling rate was 40° C./min. Two cycles from −30 to 130° C. were first conducted, followed by two cycles up to 200° C.

Environmental Scanning Electron Microscope (ESEM) and Energy Dispersive Spectroscopy (EDS)

The electron scanning microscope used was a FEI Quanta 600 operating under low vacuum. All SEM images shown were taken with a solid-state backscatter electron detector. The EDS was performed with an element EDAx at 20 keV. Standard parameters were used to quantify elements using EDAx Genesis software.

Fuel Cell Testing

The NAFION® standard membrane electrode assembly (MEA) was fabricated using a catalyst coated membrane (CCM), N211, with catalyst supplied by Tanaka Holdings Co. Ltd. The anode catalyst layer consisted of TEC 10EA30E, 30% Pt/C, 0.055 mg/$cm^2$ and a cathode catalyst layer consisted of TEC 10E50EHT, 50% Pt/C, 0.35 mg/$cm^2$ and had an active area of 2×5 $cm^2$. The PolyHPA MEAs were fabricated using commercial gas diffusion electrodes (GDE)s for both the anode and cathode (Johnson Matthey Pt/C electrocatalyst, PFSA ionomer, 0.35 Pt mg/$cm^2$). The PolyHPA-70 MEA had an active area of 2×5 $cm^2$ and the PolyHPA-75 MEA was 5 $cm^2$. The 10 $cm^2$ fuel cells were ran using flow rates, 4 L/min at the anode and 8 L/min at the cathode while the 5 $cm^2$ fuel cell were ran using flow rates of 4 L/min at the anode and 8 L/min at the cathode.

Accelerated Stress Testing (AST)

The mechanical AST was performed on an MEA in standard fuel cell hardware at 80° C. with N2 flow on both the anode and cathode and the humidity of each was switched from 100% RH to 0% RH holding for 30 s on each, making a 1 min cycle. The test was stopped, and hydrogen crossover was tested using linear sweep voltammetry with a scan rate of 1 mV/s, after 5750, 10000 and 22500 cycles. The chemical ASTs were performed on an MEA in standard fuel cell hardware by holding the fuel cell at open circuit voltage (OCV), 90° C., 30% RH anode and cathode, zero current, and $H_2/O_2$ flow.

Results and Discussion

Figure 7:
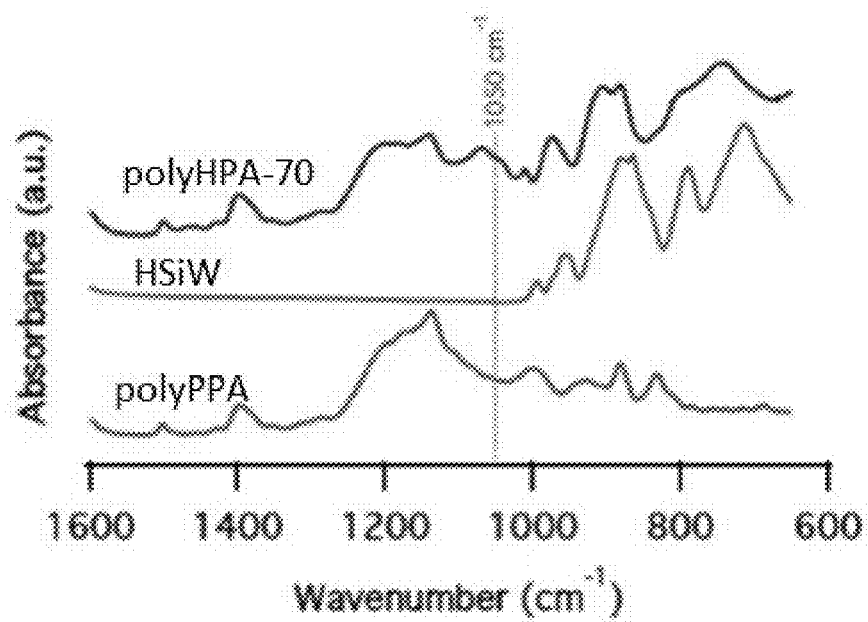
FIG. 7 illustrates IR spectrum (1600-600 $cm^{-1}$) for polyPPA (bottom), HSiW (middle) and polyHPA-70 (top)
Figure 8A:
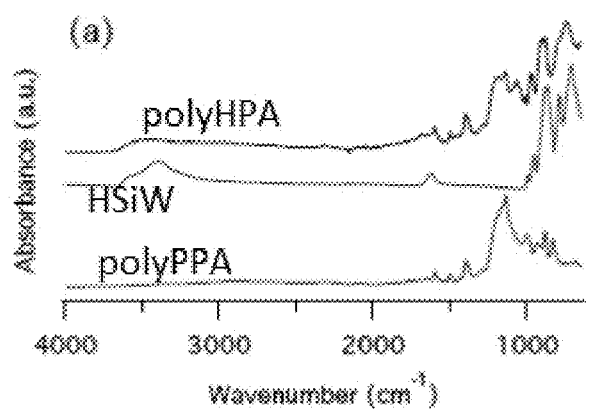
FIG. 8A illustrates the IR of polyPPA (bottom), HSiW (middle) and polyHPA (top)
Figure 8B:
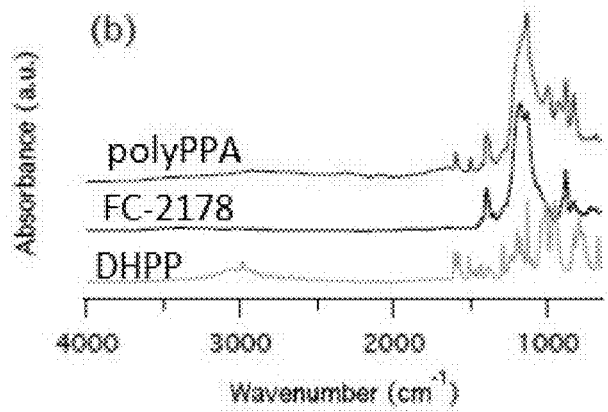
FIG. 8B illustrates the IR of DHPP (bottom) and a fluoropolymer (FC-2178) (middle) and polyPPA (top)

IR spectra in the range of interest for species involved in the attachment of HSiW can be seen in FIG. 7 and full spectra for all intermediates involved in the synthesis are illustrated in FIGS. 8A and 8B. The IR spectra are dominated by the —$CF_2$-stretching peaks at 1200 and 1130 $cm^{-1}$ (symmetric and asymmetric, respectively) for fluoropolymer (FC-2178) and the PolyPPA. Strong signals from the aromatic group at 1200 and 1180 $cm^{-1}$ are present in both the DHPP and the PolyPPA, as expected. While the C—O—Ar bond formed in step 1 is not identified, the washed functionalized PolyPPA shows aromatic groups, which would have washed away if not covalently attached to the polymer.

Moving on to the reactants and product for the attachment of HSiW to PolyPPA, it is evident that signatures from both HSiW and PolyPPA exist in the washed PolyHPA. Most notably are the —$CF_2$— stretching bands and the strong W—O bands between 700 and 1000 $cm^{-1}$. More thorough analysis of these bands indicates a shift to higher wavenumbers after the attachment, as expected from the aforementioned work with attaching small, organic molecules ($v_{as}$(W=Oter) as a doublet at 863→879 and 879→904 $cm^{-1}$, $v_{as}$(W-Oe-W) 786→797, and $v_{as}$(W-Oc-W) 710→739). The $v_{as}$(Si-Oa) band is also identified and displays a similar shift from 956 to 974 $cm^{-1}$. Additionally, a peak at 1050 $cm^{-1}$ is present in the product and neither of the reactants. Small molecule chemistry work has identified this as the P—O bond, indicative of covalent attachment of the HSiW to the polymer sidechains. While the IR data provides compelling evidence that the synthesis has occurred as expected, NMR was used to corroborate the covalent attachment.

Figure 9A:
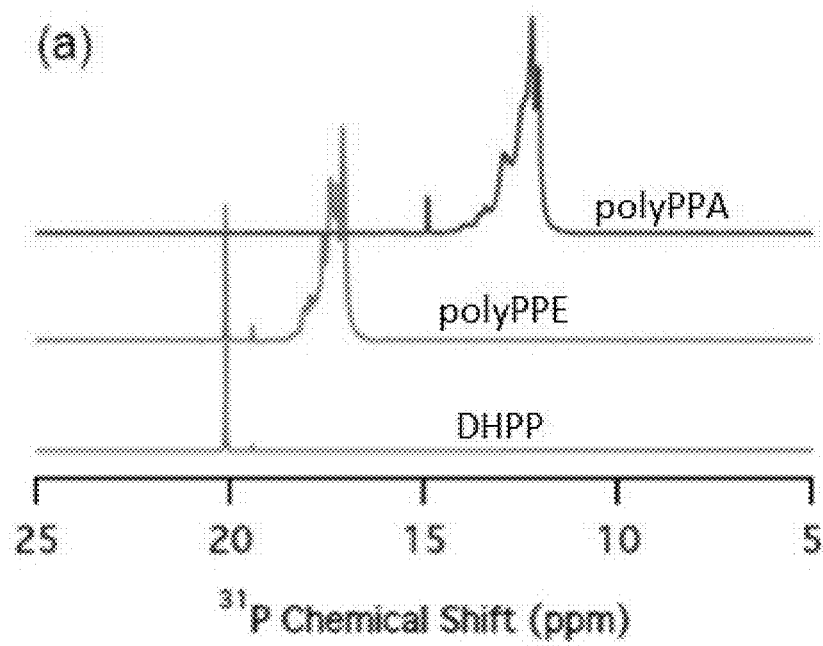
FIG. 9A illustrates $^{31}P$ NMR of DHPP (bottom), polyPPE (middle), and polyPPA (top)
Figure 9B:
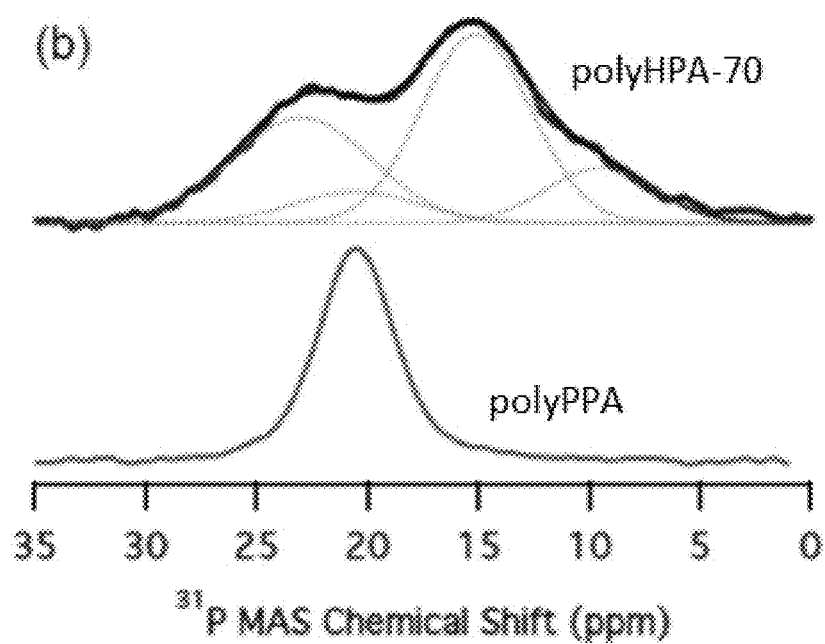
FIG. 9B illustrates $^{1}H \rightarrow ^{31}P$ CP/MAS NMR of polyPPA (bottom) and polyHPA-70 (top); where the polyHPA-70 spectra is modelled using 4 Gaussian peaks.
Figure 9C:
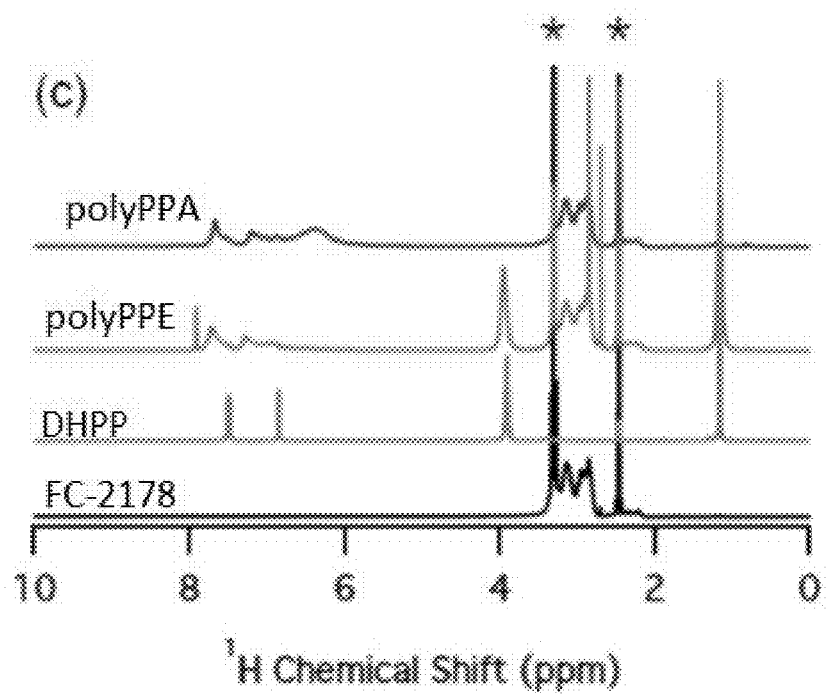
FIG. 9C illustrates $^{1}H$ NMR for polyPPA, polyPPE, DHPP, and FC-2178 from top to bottom, respectively, where the remaining solvent peaks are labeled with (*)

Further evidence for the validity of the synthetic scheme was shown by 1H NMR (FIG. 9C). First in the DHPP, the aromatic protons are located at 6.9 and 7.5 ppm and the —$CH_2$— and —$CH_3$ chemical shifts are at 3.9 and 1.2 ppm, respectively. The —$CH_2$— groups in the fluoropolymer (FC-2178) are located between 2.7 and 3.3 ppm. When the DHPP is attached to the polymer, the product contains the same —$CH_2$— signals from the fluoropolymer (FC-2178) in addition to the aromatic peaks and the peaks at 3.9 and 1.2 ppm. Next, the hydrolysis is performed on the PolyPPE and the phosphonate ester —$CH_2$— and —$CH_3$ chemical signatures are eliminated, as expected, and a new broad band exists at 6.5 ppm and is assigned to the —OH bonds.

Figure 10:
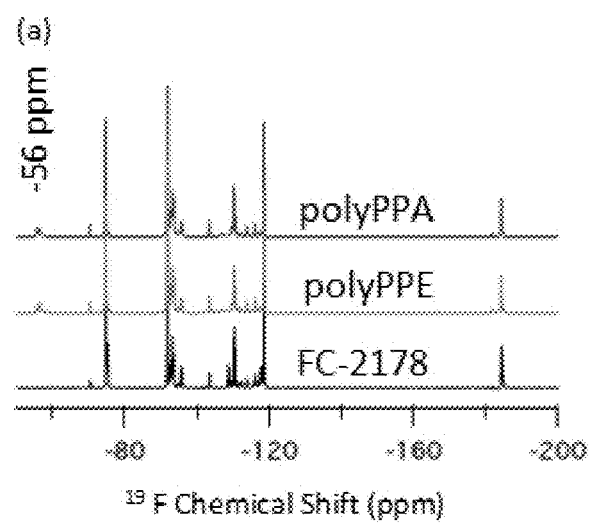
FIG. 10 illustrates $^{19}F$ NMR data for polyPPA, polyPPE, and FC-2178 from top to bottom, respectively.

The $^{19}$F NMR (FIG. 10) indicates that when adding the sidechain, an additional peak at −55 ppm appears which is consistent with other studies on PVDF-HFP. Also compelling for the functionalization of the polymer comes from $^{31}$P NMR (FIGS. 9A and 9B). First, when the DHPP is attached to the polymer there is a change in chemical shift (21→17.5 ppm) and the peak becomes broader and more complex. At this point, some unattached DHPP is still present (sharp peak at 21 ppm), but after the hydrolysis step, the sharp peak at 21 ppm vanished and the only peak is at 12 ppm (the expected shift for PolyPPA). The final HSiW attached film is cross-linked and not soluble in NMR solvents; therefore, liquid $^{31}$P NMR is not possible. To probe the chemical nature of the final material $^{31}$P CP/MAS NMR was performed on both PolyPPA and PolyHPA-70. The chemical shift of PolyPPA is different in the solid phase than it is in the liquid NMR likely due to the water content and solvation and is shown for comparison to the PolyHPA-70 (FIG. 9B). Using a Gaussian fit to model the spectra, four chemical shifts are identified (23, 20.5, 15.1, and 9.5 ppm). The peak at 20.5 ppm is residual phenol phosphonic acid. The three remaining peaks are attributed to HSiW with one phosphorous attachment (23 ppm), HSiW with two phosphorous attachments (15.1 ppm), and a phosphorous anhydride (9.5 ppm).

Membrane Characterization (Ex-Situ Evaluation)

Figure 11:
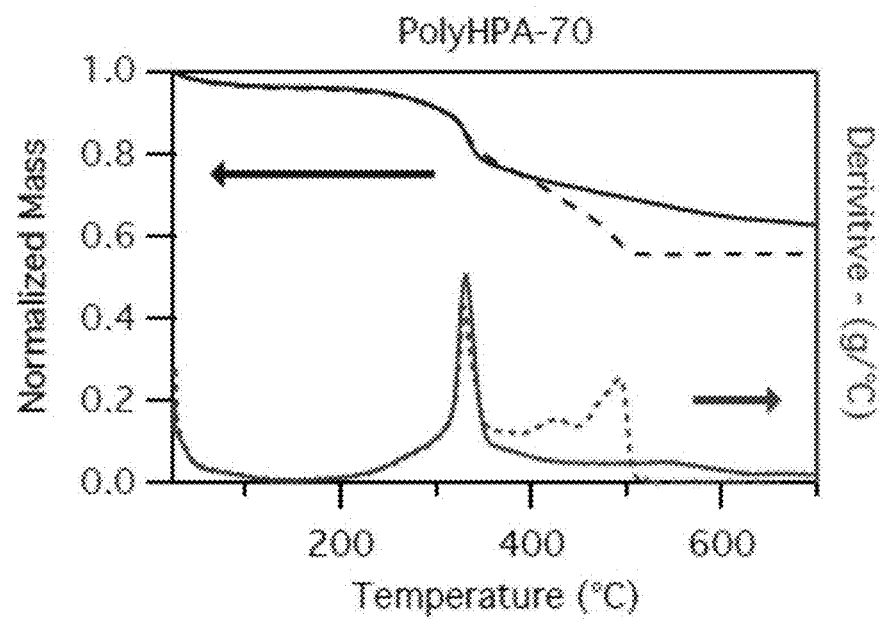
FIG. 11 illustrates TGA data in nitrogen gas (solid lines) and air (dashed lines) for polyHPA-70 where the residue at 800° C. is 56%, where the top lines are associated with the normalized mass and the bottom lines are associated with the derivative.
Figure 12:
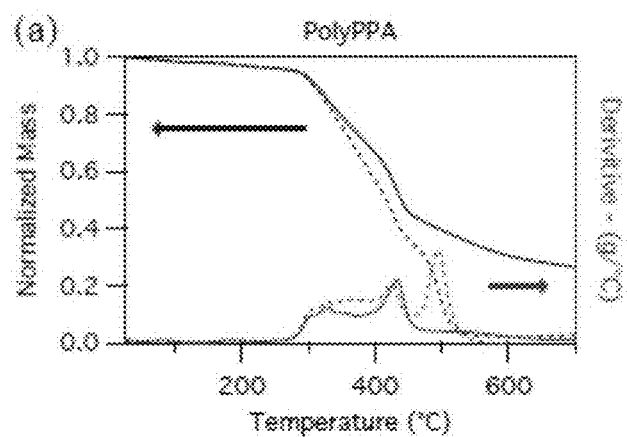
FIG. 12A illustrates TGA data in nitrogen (solid lines) and air (dashed lines) for normalized mass (top lines) and derivative (bottom lines) for polyPPA residue in air at 700° C. is 2%.
FIG. 12B illustrates TGA data in nitrogen (solid lines) and air (dashed lines) for normalized mass (top lines) and derivative (bottom lines) for HPA-OH residue in air at 500° C. is 96%.
FIG. 12C illustrates a HPA-OH structure.
Figure 12B:
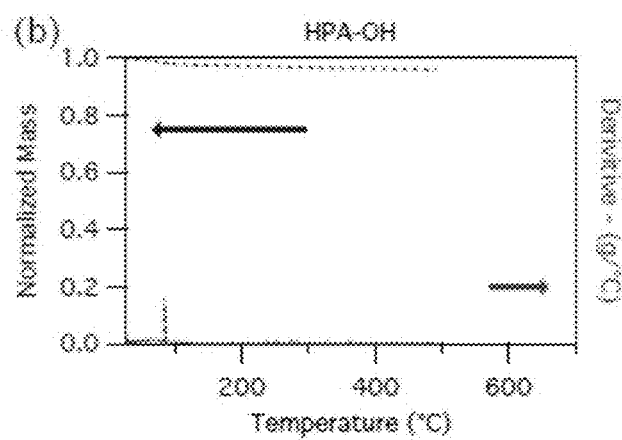
Figure 12C:
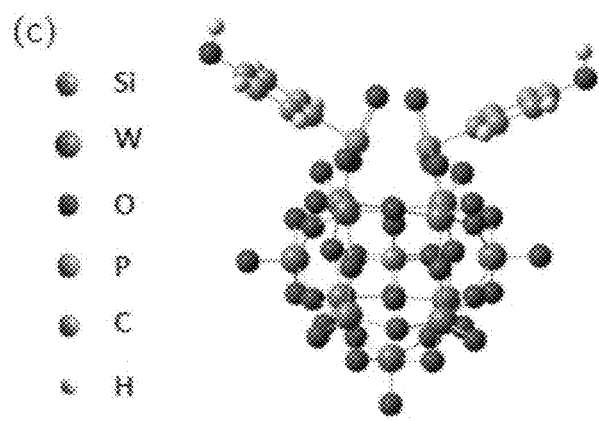

The thermal stability was investigated with TGA on the PolyHPA-70 (FIG. 11), PolyPPA (FIG. 12A), and a small model compound (FIGS. 12B and 12C). The PolyPPA has several distinct decomposition regions. First, marginal weight loss occurs before 280° C., all of which can be attributed to loss of water. Next, between 280 and 400° C. there is a constant and substantial loss at 0.2% per ° C. Finally, two inflection points exist at 420° C. and 490° C. where the latter only exists in the presence of Air, a more oxidizing environment. PVDF-HFP has a thermal decomposition temperature near 450° C. in $N_2$, but no significant mass loss occurs beforehand. This indicates that the decomposition before is due to the decomposition or loss of the sidechain. TGA of HPA-OH (FIG. 12C) indicates that the organic hybridized HPA moiety is not susceptible to large mass losses and a majority of the mass loss is from instabilities in the PolyPPA. With that said, HPA can undergo a loss of two $H^+$ and a terminal oxygen to form water, thereby reducing the concentration of mobile $H^+$ in the film. This decomposition is difficult to discern from loss of bound water and theoretically has a strong variance on partial pressure of water. With the high decomposition temperature of this material, it is mostly limited by loss of charge (not seen in TGA). Heteropoly acids are known to be unstable in alkaline conditions and therefore traditional titrations to measure ion exchange capacity (IEC) are not possible. The IEC was calculated using the residue from TGA, which suggests that a large portion of water stable inorganic material has been added to the polymer. The residue at 800° C. in air is ca. 4% and 55% for the PolyPPA and PolyHPA-70, respectively. Calculations, assuming the residue is $WO_3$, available in the supporting information, give an IEC of 0.86 mmol $H^+$/g PolyHPA-70 and that nearly all of the added HSiW is stable to soaking in acid followed by water.

Figure 13A:
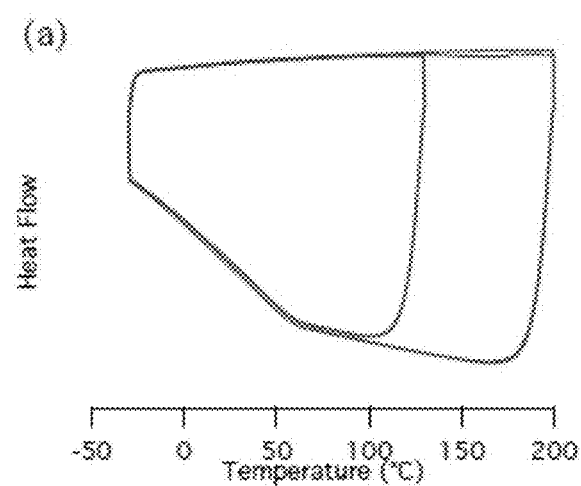
FIG. 13A illustrates a DSC of polyPPA.
Figure 13B:
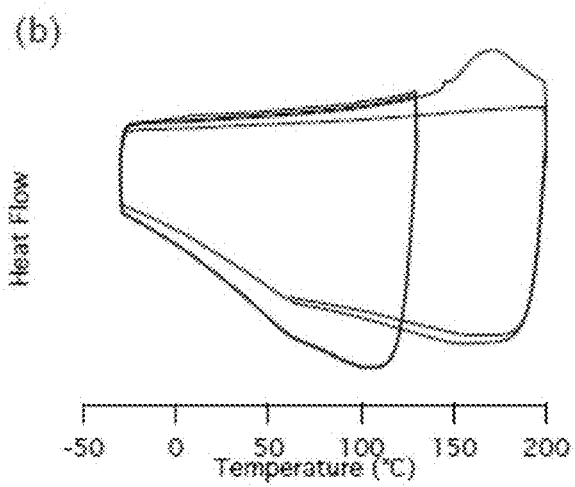
FIG. 13B illustrates a DSC of polyHPA.
Figure 13C:
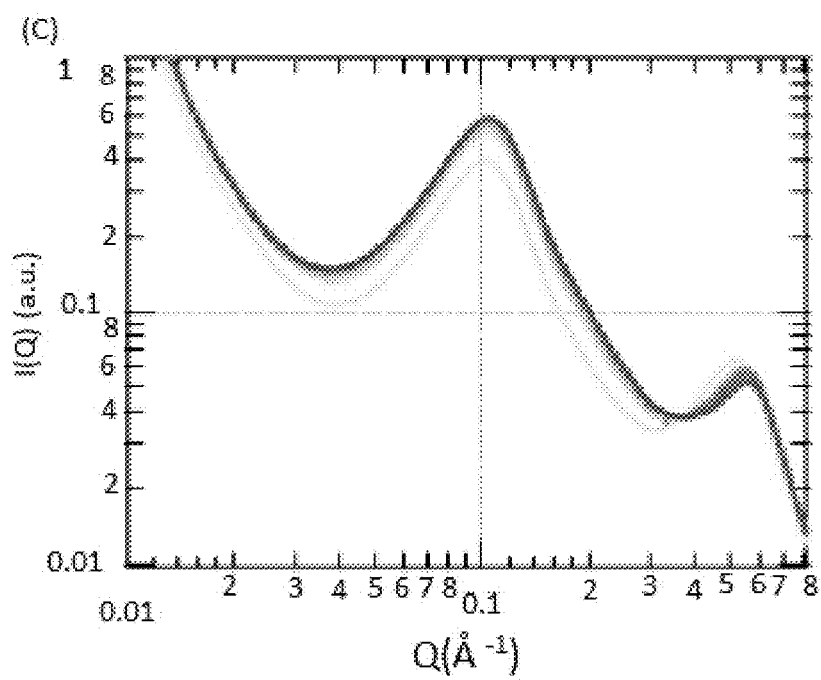
FIG. 13C illustrates SAXS data for an in-situ annealing study where the film was heated from room temperature to 160° C. then held for 5 minutes.

The DSC data can be seen in FIG. 13A-13C and has two clear transitions. First, at 60° C. there is a thermal transition in both the PolyPPA and PolyHPA-70. The $T_\alpha$ for PVDF-HFP is −13° C. Tβ of the sidechains. In the first heating of the PolyHPA-70 (non-annealed) there is an endothermic transition starting near 160° C. which could be a chemical reaction or crystallization. An in-situ SAXS annealing experiment was performed on PolyHPA-70 (non-annealed) to observe the morphological changes when annealed, but no indication of change in the morphology was observed, therefore this is attributed to a crosslinking reaction (see FIG. 13C). Using this knowledge, all films were processed at 160° C. for 5 min to enhance crosslinking and avoid thermal decomposition.

Figure 14:
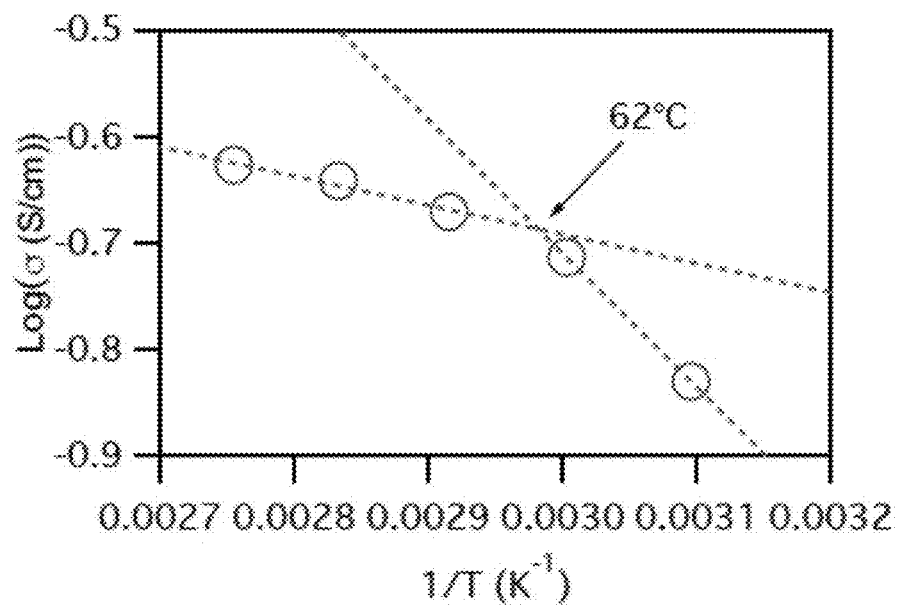
FIG. 14 illustrates the conductivity of polyHPA-70 at 95% RH and various temperatures with trend lines to guide the eye.
Figure 15A:
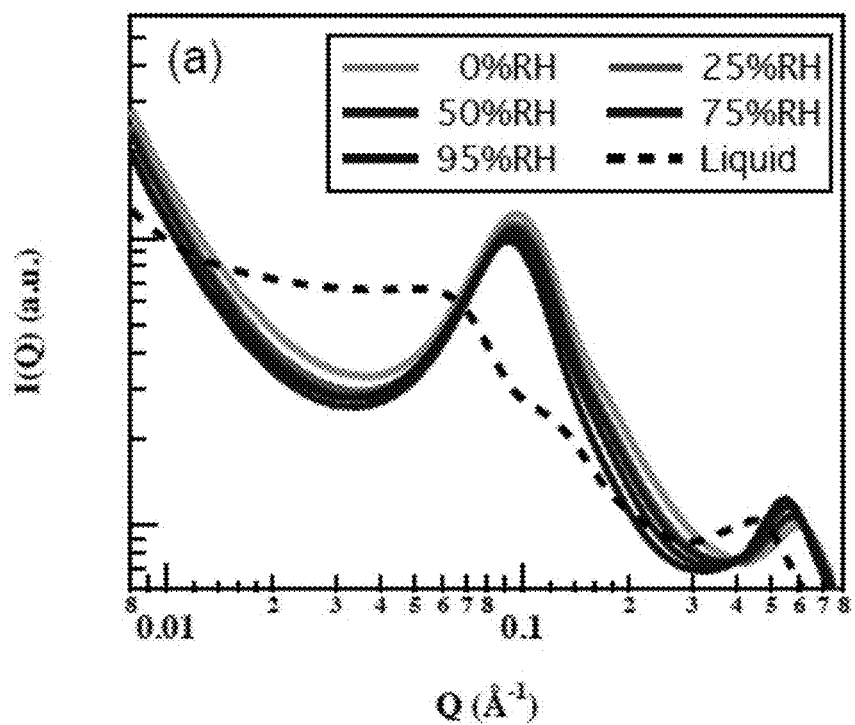
FIG. 15A illustrates SAXS at various humidities and in liquid water.
Figure 15B:
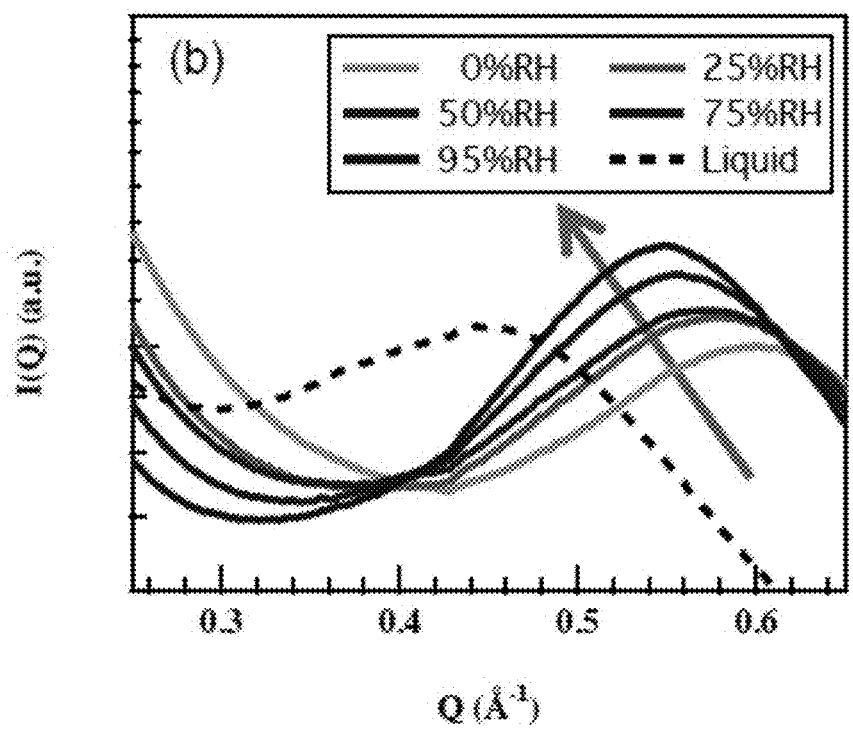
FIG. 15B illustrates a high q regions of the SAXS.
Figure 15C:
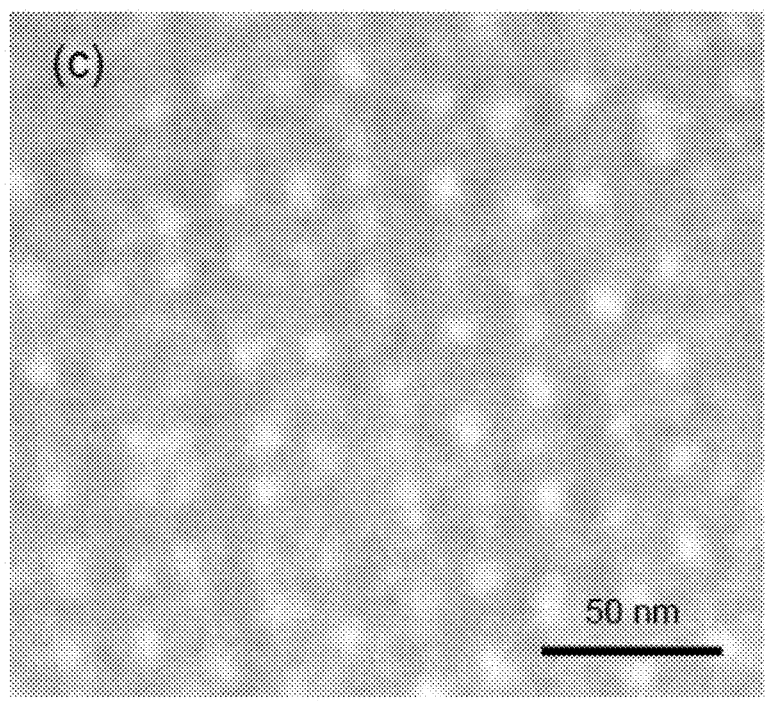
FIG. 15C illustrates a TEM darkfield micrograph of polyHPA.
Figure 15D:
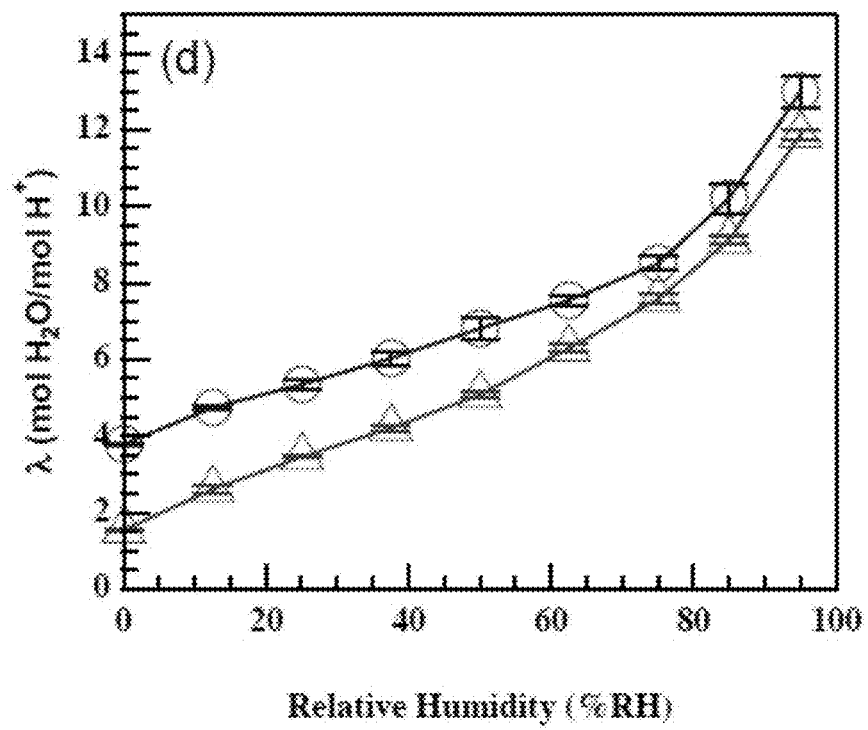
FIG. 15D illustrates lambda v. relatively humidity for NAFION® (Δ) and polyHPA (O)

The proton conductivity, seen in FIG. 14, is >0.1 S/cm at all of the temperatures measured (50-90° C. and 95% RH) and exhibits two different regimes of transport that intersect near 60° C., the Tβ of the hydrophilic sidechains. The values at 80° C. and 95% RH are remarkably high, 228 and 298 mS/cm for the PolyHPA-70 and PolyHPA-75, respectively. At lower temperatures, the energy barrier for transport is over 4 times greater than when compared to above 60° C. This conductivity should enable high performance, practical devices and contributes to the low in-situ area specific resistances, discussed in the next section. The polymer's morphology was investigated using FIB/TEM under vacuum and SAXS under conditions relevant to fuel cell operation (elevated temperature and humidity). Bright spots in the TEM backscatter micrograph indicate regions with more heavy elements and appear to be on the order of 5-10 nm as illustrated in FIG. 15C. While not wishing to be bound by theory, the inventors believe that the apparent lamellar configuration of the clusters is an artefact of the Ga ion milling process. From the EDS measurements (FIG. 16B), it is clear that the heaviest element in high concentration is W, therefore the bright spots must represent a phase enriched in W. In conjunction with the IR showing that the W still exists as HSiW moieties leads to the conclusion that the domains enriched in heavy elements are enriched with HSiW. Table 1 provides calculated values of different elements for polyPPA and polyHPA-70.

TABLE 1

|  | PolyPPA | | PolyHPA-70 | |
| --- | --- | --- | --- | --- |
|  | wt % | at % | wt % | at % |
| C | 34.7 ± 0.5 | 46.5 ± 0.7 | 10.2 ± 1.3 | 28.7 ± 0.4 |
| O | 17.5 ± 0.5 | 17.6 ± 0.5 | 13.9 ± 3.0 | 29.0 ± 2.7 |
| F | 33.9 ± 1.0 | 28.7 ± 0.8 | 8.7 ± 1.8 | 15.4 ± 1.4 |
| Al | 1.4 ± 0.1 | 0.8 ± 0.1 | 0.3 ± 0.1 | 0.4 ± 0.1 |
| Si | 0.2 ± 0.4 | 0.1 ± 0.1 | 12.6 ± 0.4 | 15.2 ± 2.1 |
| P | 11.9 ± 0.3 | 6.2 ± 0.1 | 1.3 ± 0.0 | 1.5 ± 0.2 |
| W | 0.5 ± 0.2 | 0.0 ± 0.0 | 52.9 ± 5.6 | 9.8 ± 2.0 |

The second phase will hereafter be referred to as the HSiW deficient phase. This HSiW deficient phase is continuous whereas the HSiW enriched phase is non-continuous. The SAXS aligns with this narrative.

Figure 16A:
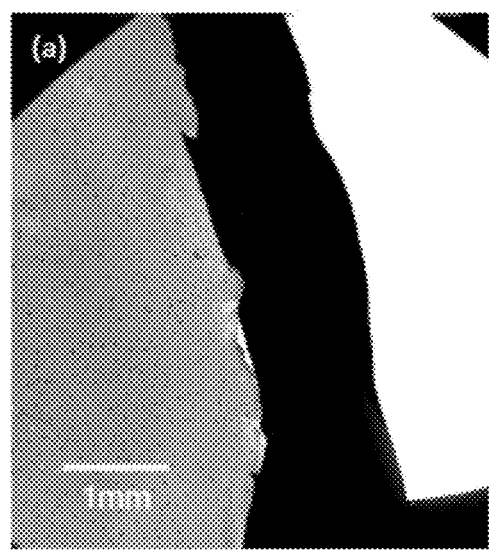
FIG. 16A illustrates a SEM of polyPPA (left) and polyHPA-70 (right)
Figure 16B:
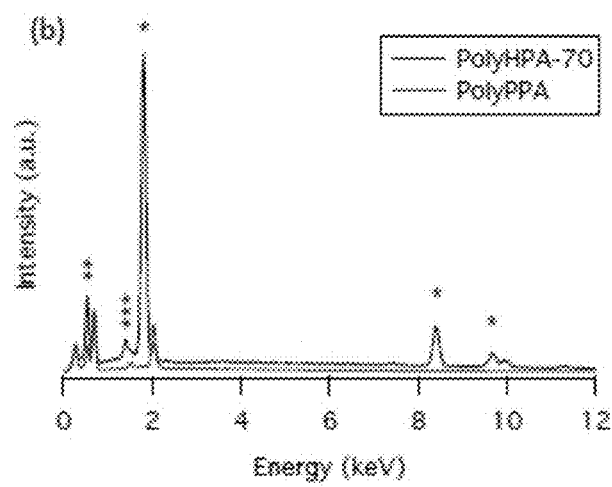
FIG. 16B illustrates a EDS data comparing polyPPA (bottom) and polyHPA-70 (top) to each other where the polyHPA data was normalized using C Kα and F Kα from polyPPA.

The SAXS equilibrated in air provides two peaks, one at 0.097 and the other at 0.6 A-1 corresponding to d-spacing values of 6.5 and 1.0 nm (FIG. 16A). The 1.0 nm feature is likely the spacing between two adjacent HSiW molecules and the 6.5 nm feature is likely the spacing between HSiW rich and deficient domains. Examination of the high q peak, FIG. 16B, show a shift to lower q, or larger d-spacing that is highly dependent on RH. Interestingly with this system of HSiW and PolyPPA, this same SAXS pattern predominates whenever the material is processed. This strongly implies that a thermodynamic minimum is achieved with clusters of HSiW separated by a characteristic length of 6.5 nm. A drastic change is noted in the scattering pattern of the liquid-soaked film, FIG. 16A. The liquid-soaked film has a lower scattering intensity and the peak transforms into a shoulder. The drop in intensity may be due to swelling in the x-y plane resulting in less material for the xrays to pass through. The broadening of the peak is indicative of a widening distribution of d-spacing. This is evidence that the HSiW enriched phase is changing and becoming more continuous. As compared to the NAFION® standard the water content in the film, more water per proteogenic group is present at all humidities (See FIG. 16D). The difference is most dramatic at low humidities where the highly hydroscopic nature of the HSiW causes retention of 3.79 $H_2O/H^+$ in dry $N_2$ at 60° C., as determined by TGA, compared to 1.55 for NAFION®. Considering the transport properties of this two-phase material, two scenarios are expected to be possible. Case 1: the 5-10 nm clusters are highly conductive. In this case, because the highly conductive phase is non-continuous, the long-range transport properties will be dictated by the other phase (HSiW deficient). Case 2: the 5-10 nm clusters are poorly conductive. In this case, the $H^+$ will likely transport around the poorly conductive region and only experience some added tortuosity. In both cases the continuous, HSiW deficient phase will dictate the transport properties. It is then evident that for a given HSiW loading, less clusters would improve the long-range proton transport through increasing the HSiW content in the continuous phase.

Chemical and Mechanical Stability

Figure 17A:
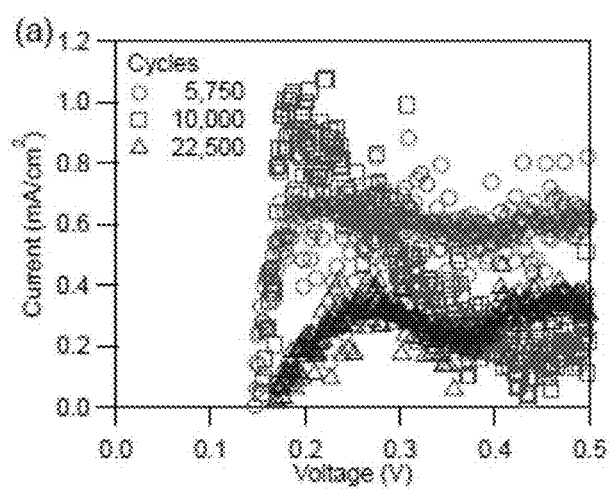
FIG. 17A illustrates data from mechanical AST that was conducted on an 80 micron film with each cycle consisting of 30 seconds dry then 30 second wet nitrogen flow and is the hydrogen crossover test performed several times during the test.
Figure 17B:
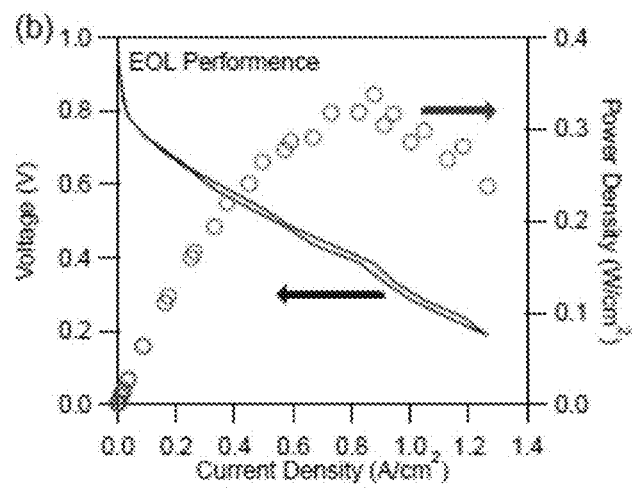
FIG. 17B illustrates the polarization data collected after 22,500 cycles at 80° C. for 100% RH.
Figure 18:
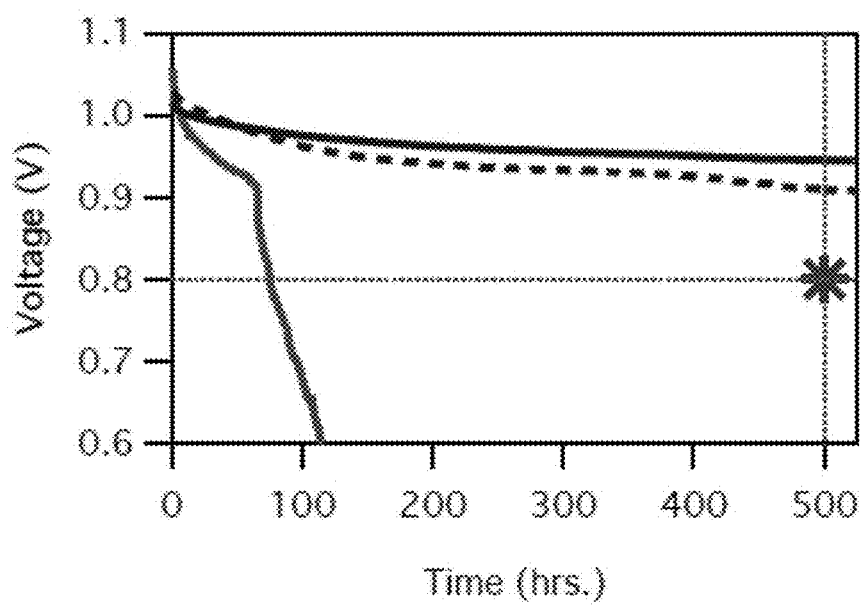
FIG. 18 illustrates OCV hold tests at 90° C. and 30% RH under hydrogen gas/oxygen gas flow and no current, where the top two traces are replicated at 80 micron film with a NAFION® 211 (N211) film for comparison (bottom trace)

This material has been designed to solve the chemical stability issues discussed in the introduction through incorporation of a large amount of HSiW (a radical decomposition catalyst) into a polymer film. To probe the chemical and mechanical stability of these materials, ASTs, based on U.S. Department of Energy (DOE) protocols, were performed. Several PolyHPA-70 (80 µm) films were used for preliminary testing. The film easily passed the mechanical AST with <1 $mA/cm^2$ hydrogen crossover after 22,500 wet dry cycles (LSV and end of life performance are shown in FIGS. 17A and 17B). While this is an achievement, films with mechanical supported are often able to easily pass this AST and this problem is considered solved by many in the community. The challenge that motivated this research was making a film that was highly chemically stable. To test the hypothetical chemical stability of this material, a chemical AST was performed. Under these conditions, standard polymer electrolyte membranes degrade rapidly, this is due to radical generation and subsequent attack of the polymer film. It has been previously demonstrated that the decay is much more rapid under an $O_2$ environment, as used here, as opposed to Air, the standard DOE protocol. Under $O_2$ during this test Pt has been shown to dissolve and precipitate as a Pt band in the membrane, this phenomenon is also seen in real fuel cells that are cycled through OCV. The accelerated degradation, in the AST using $O_2$, has been attributed to decomposition of the PFSA polymer near the Pt band, which is more prevalent in $O_2$ environments. FIG. 18 is the OCV vs. time for two different batches of PolyHPA-70 (80 µm) and a NAFION® 211 control. This remarkable low OCV decay (100 µV/hr), without OCV recovery, and under very harsh conditions represents the lowest rate reported to date in the literature. This accomplishment is particularly remarkable because the HSiW acts as both the proton conducting moiety and the radical decomposition catalyst allowing for high performance with a highly chemically and mechanically stable material.

Fuel Cell Performance (In-Situ Evaluation)

Figure 19:
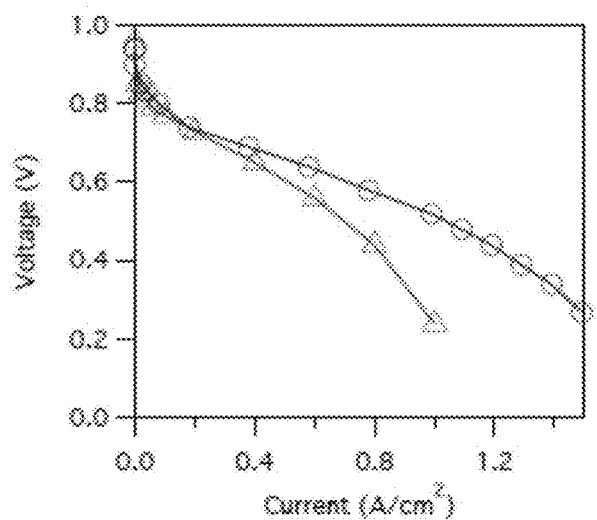
FIG. 19 illustrates a fuel cell performance of N211 (O) and polyHPA-70 (Δ) in using air/hydrogen gas at 80° C. and 100% RH.
Figure 20:
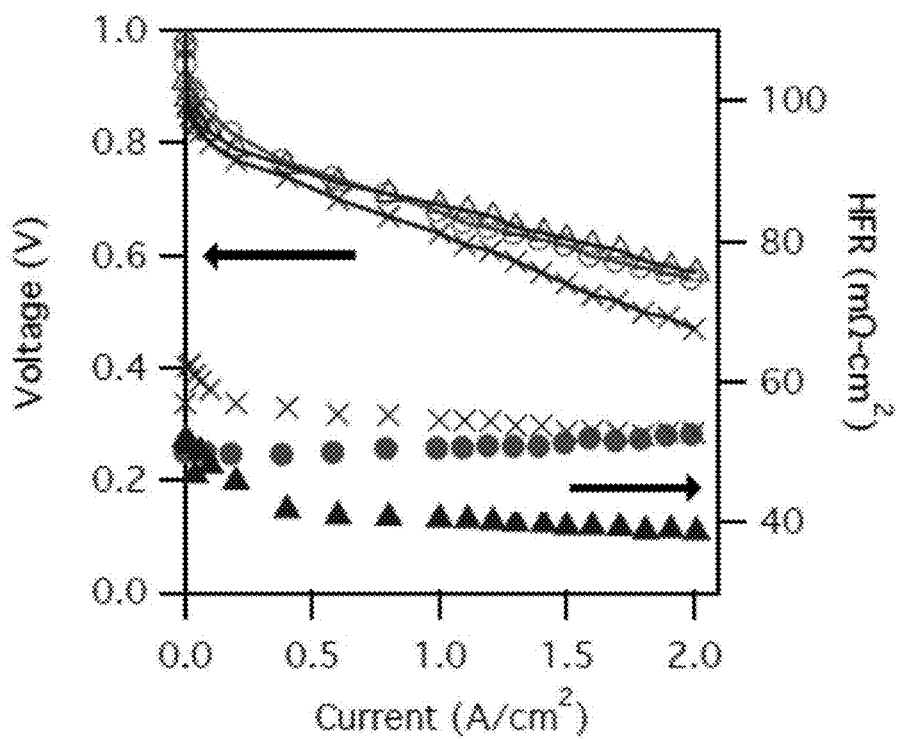
FIG. 20 illustrates IV data for N211 (O, 25 micron), polyHPA-70 (X, 48 microns), and polyHPA-75 (Δ, 20 micron) at 80° C. and saturated inlet gases.

In addition to the chemical stability, this material was designed to have exceptional $H^+$ transport properties, as heteropoly acids are some of the most conductive solids known due to their highly delocalized negative charge, as stated in the introduction. A 48 m film of PolyHPA-70 and a 20 µm film of PolyHPA-75 were used to fabricate fuel cells where the films had 70 and 75 theoretical wt % HSiW loadings, respectively. The performance under a $H_2$—$O_2$ environment was evaluated and compared with an MEA constructed from N211 and standard electrodes optimized for N211. The PolyHPA fuel cells do not utilize optimized electrodes and the testing presented here is used solely to evaluate the PolyHPA membranes and are not to be taken as the performance of a future optimized fuel cell, using these materials. In fact, this is evident from the mass transfer limitations observed under $H_2$/Air operation (illustrated in FIG. 19). The IV performance (FIG. 20) of the PolyHPA-75 looks very similar to N211, but considering the HFR (high frequency resistance), a 22% reduction is observed at high current densities with a film of similar thickness.

Figure 21A:
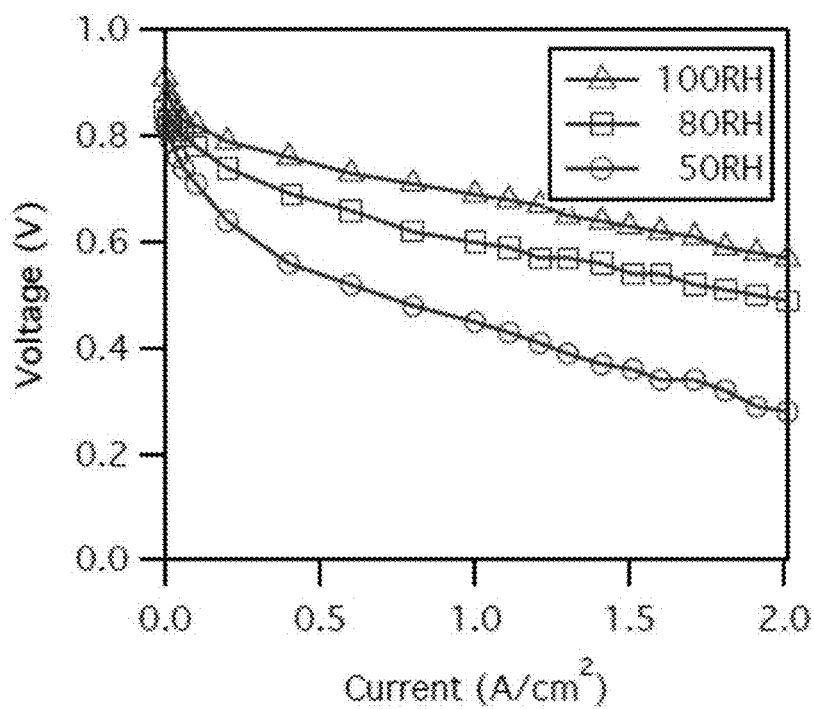
FIG. 21A illustrates polyHPS-75 voltage at different relative humidities.
Figure 21B:
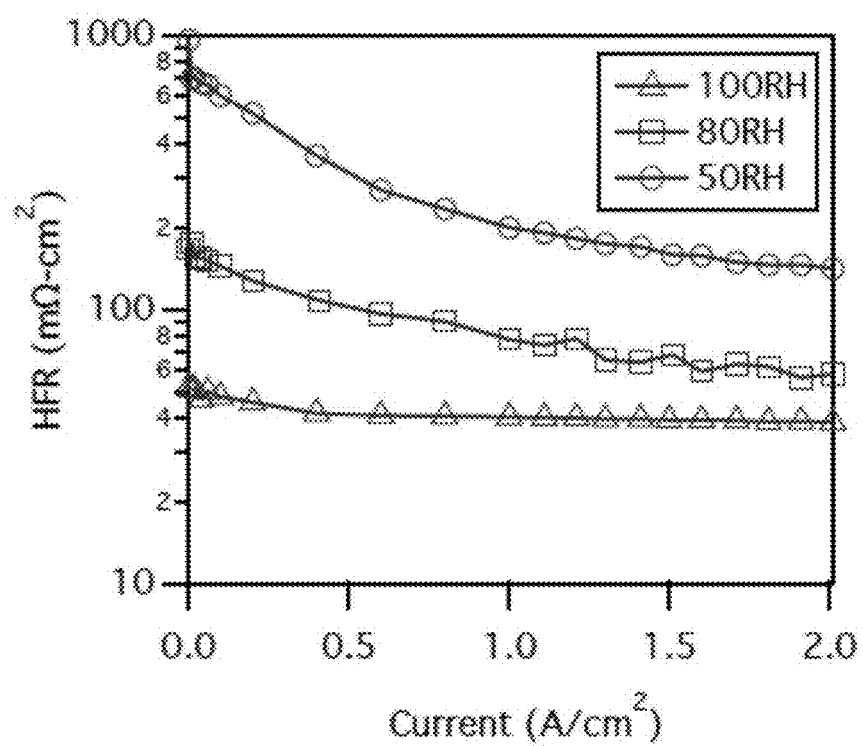
FIG. 21B illustrates HFR at different relative humidities.

The PolyHPA-70 fuel cell was evaluated under low humidity operation at 80° C., illustrated in FIGS. 21A and 21B. A drop in voltage and an increase in HFR is seen, as expected. At low current densities the HFR starts out near 1000 mΩ-cm2, but drops to 141 mΩ-cm2 at 2 $A/cm^2$. This HFR drop could partly be attributed to increase in water generation from increasing current densities.

Figure 22:
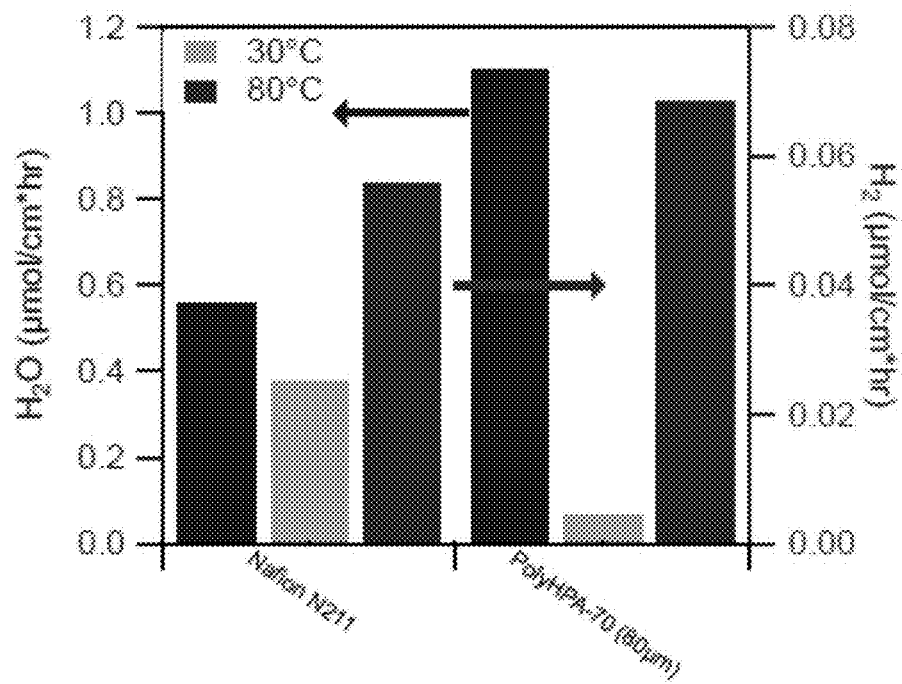
FIG. 22 illustrates species transport in MEA for N211, and two different polyHPA-70 films and hydrogen transport rates, which were measured at 100% RH normalized by thickness.

The transport rates of $H_2$ and $H_2O$ in the device are similar to N211. The $H_2$ crossover, normalized for thickness, is slightly higher for PolyHPA-70 (0.69 µmol/$cm^2$-hr) than for N211 (0.56 µmol/$cm^2$-hr) at 80° C. The H2O transport rate in PolyHPA-70 is double that of N211 (0.55, and 1.10 µmol/$cm^2$-hr, respectively). All of the species transport data (illustrated in FIG. 22) have been normalized for film thickness to provide a fair comparison. The rapid water transport rate is important, allowing for rapid diffusion of water from the cathode to the anode even with thicker films, which reduces the need for external humidification.

The thicker film PolyHPA-70 fuel cell also shows outstanding HFR when compared to the thinner film N211 fuel cell. While this outstanding HFR does not result in the expected improvements in power, it is likely due to limitations of the MEA, not the PolyHPA membranes.

Example 3

Figure 23:
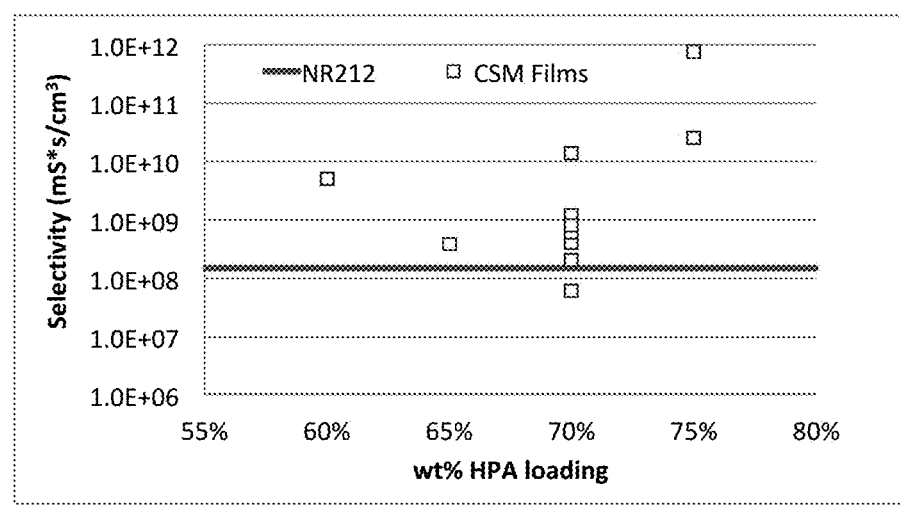
FIG. 23 illustrates the selectivity of $H^{+}$ transport over $Fe^{3+}$ transport v. HPA loading.

Poly HPA polymers were tested for selectivity and illustrate a greater selectivity to use the different proton transport mechanisms that is characteristic to HPAs. Several samples have been prepared and were tested to compare the selectivity of the films of the present invention to PFSA NAFION®211. FIG. 23 illustrates the selectivity of $H^+$ transport over $Fe^{3+}$ transport v. HPA loading. Notably, different types of HPA were used as the CSM films. Collectively, the films show better selectively for a variety of samples.

Figure 24:
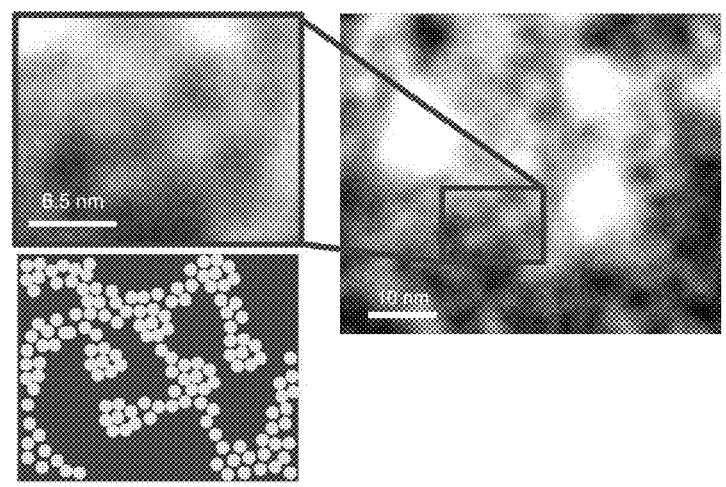
FIG. 24 illustrates a TEM darkfield image of PolyHSiW11 and a cartoon representation where the yellow spheres represent individual 1 nm HSiW moieties.
Figure 25:
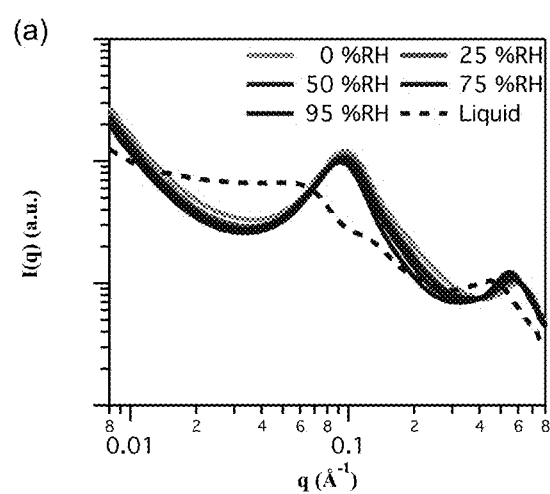
FIG. 25 illustrates the SAXS for the samples from FIG. 24.

FIG. 24 illustrates a TEM darkfield image of PolyHSiW11 and a cartoon representation where the yellow spheres represent individual 1 nm HSiW moieties. Close examination of the TEM and analysis of the SAXS illustrated in FIG. 25 results in the identification of 4 distinct features. Features of ca. 1 nm are seen in the SAXS and are identified as individual HPA moieties. When the film is in humidified air, a large peak at q=0.1 $Å^{-1}$ can be seen, which translates to a d-spacing of 6.5 nm. Analysis of the SAXS in a condensed phase indicates features of 3-4 nm and 10 nm exist. The 3-4 nm clusters seen in the TEM have a domain spacing of ca. 6.5 nm.

Figure 26:
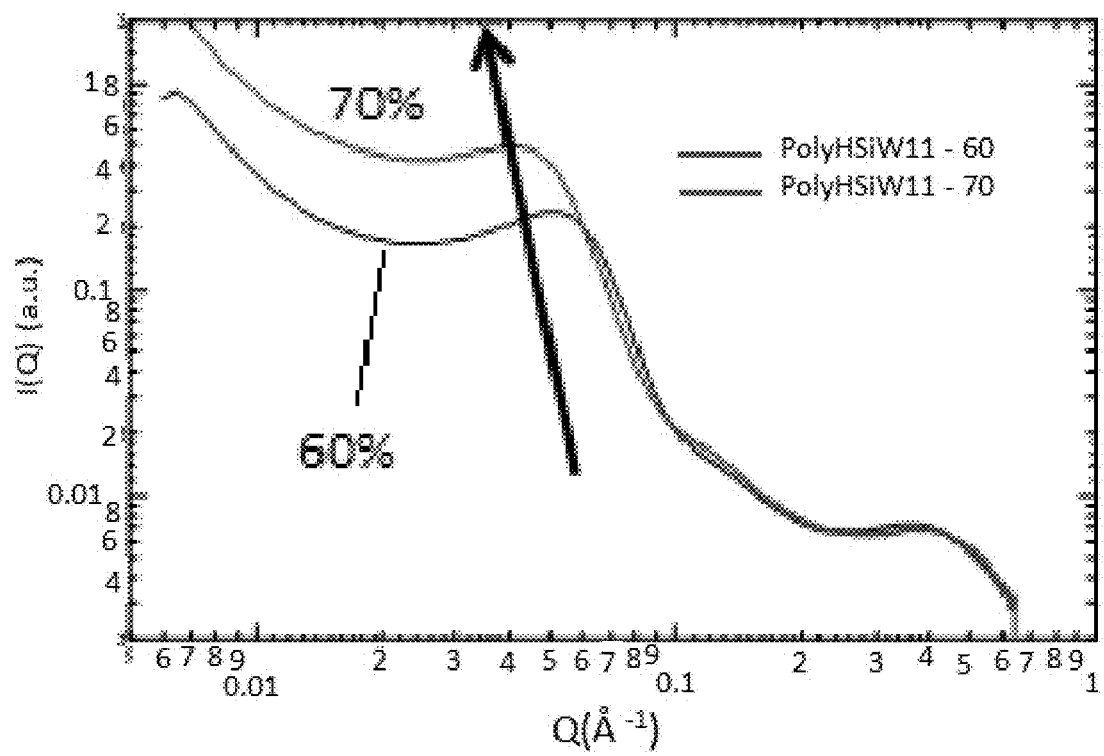
FIG. 26 illustrates the differences between different loadings of HSiW11.
Figure 27:
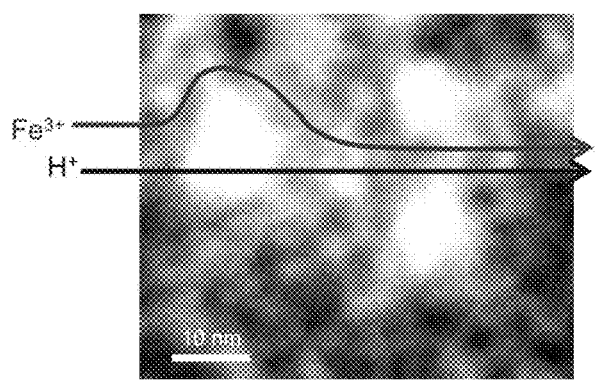
FIG. 27 illustrates an expected comparison of the paths of Fe3+ compared to H+.

FIG. 26 illustrates the differences between different loadings of HSiW11. The SAXS patterns in humidified air did not display apparent differences, but when soaked in liquid water, it was evident that more of the 10 nm features existed at the higher loading. It is believed that the presence of HSiW11 in excess of 60 wt % can produce more of these 10 nm clusters compared to prior art polymers resulting in only protons can transport through them. This effect would cause the $Fe^{3+}$ to have a more tortuous path while the $H^+$ is able to directly pass through the membrane as illustrated in FIG. 27.

Figure 28:
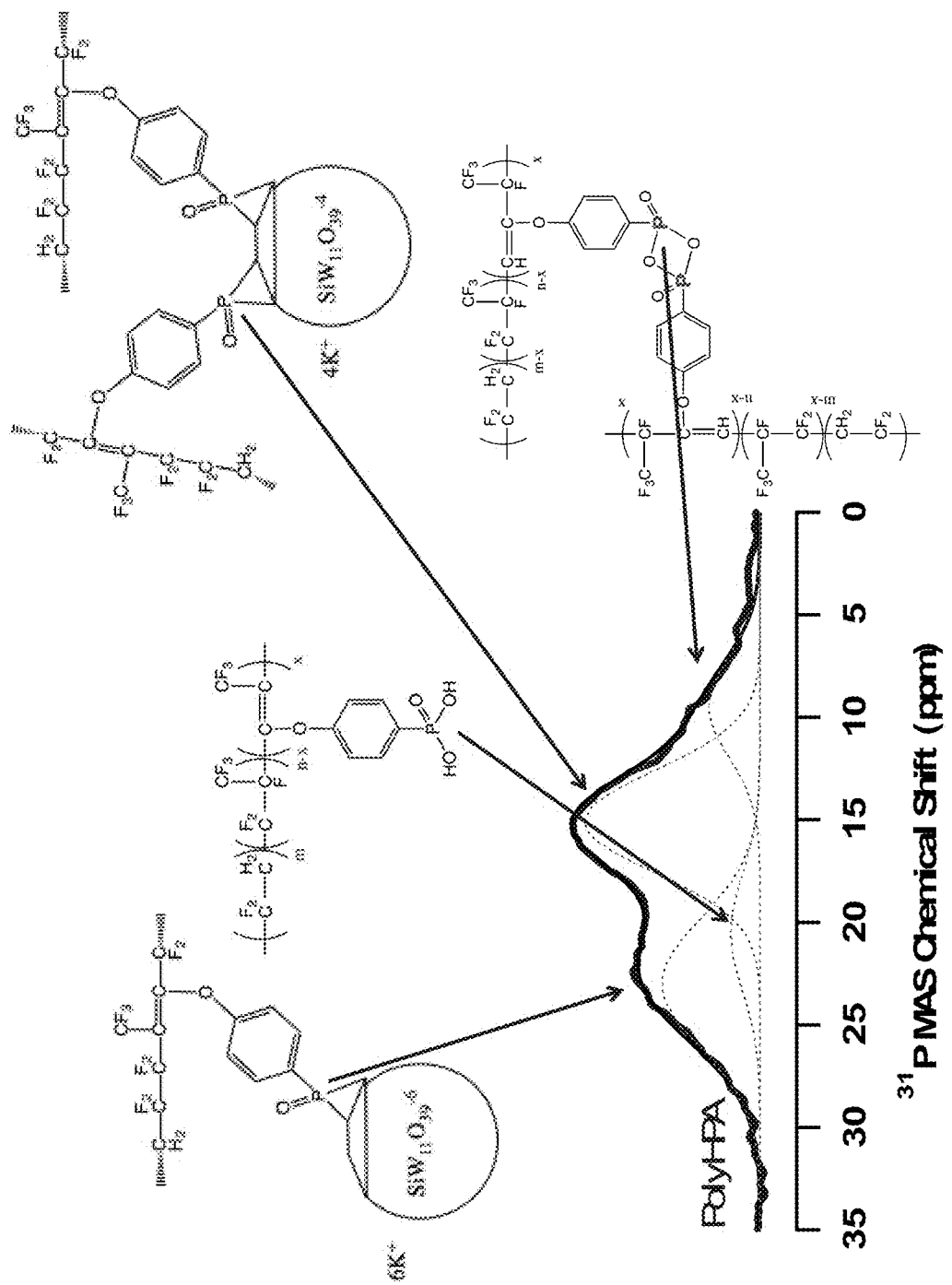
FIG. 28 illustrates $^{31}P$ MAS-NMR peak assignment of an old film (PolyHSiW11-70).

The PolyHPA materials are complex and a better understanding of the crosslinked network is needed. To probe the chemical structure of cross-linked films, solid state NMR can be used. A film that was extensively studied in the past showed chemical shifts corresponding to 4 different chemical environments. FIG. 28 illustrates $^{31}P$ MAS-NMR peak assignment of an old film (PolyHSiW11-70).

Figure 29:
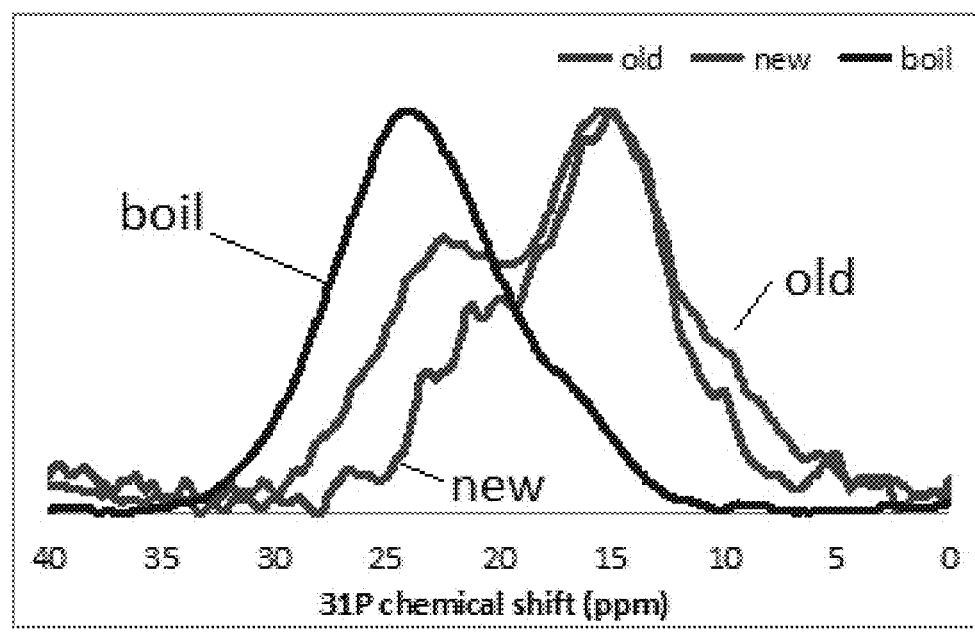
FIG. 29 illustrates $^{31}P$ MAS-NMR after boiling.

A new film of PolyHSiW11-70 was made and a portion was boiled to try and determine what changes can be expected. This test was intended to increase equilibration time, but may have resulted in the film experiencing conditions that are not realistic to flow batteries. The drastic change in the chemical shift as illustrated in FIG. 29 ($^{31}P$ MAS-NMR after boiling) can be explained by rearrangement of the chemical bonds to more thermodynamically favored states.

Figure 30:
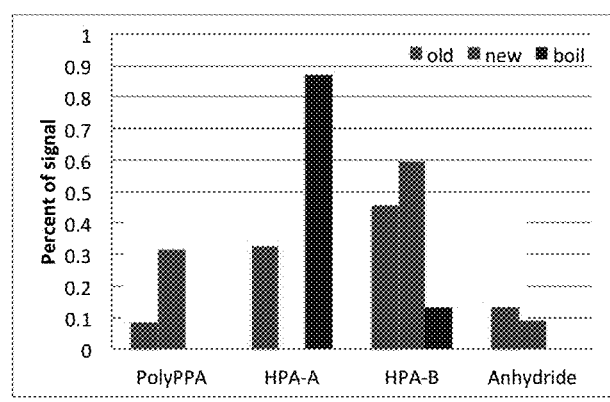
FIG. 30 illustrates the percentage of P environment between the different films.

FIG. 30 illustrates the percentage of P environment between the different films. The signal can be broken into different portions and shown as a percentage of the P that is associated with a particular chemical environment.

Ranges, for example temperatures, humidity, or time to name a few, have been discussed and used within the forgoing description. One skilled in the art would understand that any sub-range within the stated range would be suitable, as would any number within the broad range, without deviating from the invention.

The foregoing description of the present inventions, including a method to form a functionalized fluoropolymer with acidic side chains, the product thereof, devices containing the product, and methods of using the product, have been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method of making a functionalized fluoropolymer, comprising:
   mixing an aromatic molecule with an aprotic solvent to form a mixture;
   adding a reactive base to the mixture to form a second mixture;
   converting the aromatic molecule of the second mixture to an aromatic alkoxide and hydrogen gas;
   reacting at least a portion of the hydrogen gas with a fluoroelastomer; and
   mixing the aromatic alkoxide and the fluoroelastomer to form the functionalized fluoropolymer.

2. The method of claim 1, wherein the aprotic solvent is at least one of a methylethylketone (MEK), a dimethylacetamide (DMAc), a dimethyl sulfoxide (DMSO), or a dimethylformamide (DMF).

3. The method of claim 1, wherein a molar equivalents of the reactive base to the mixture is about 1.5.

4. The method of claim 1, wherein the aromatic molecule comprises a sub stituent.

5. The method of claim 1, wherein the aromatic molecule is a phenol.

6. The method of claim 4, wherein the substituent is selected from FIG. 2.

7. The method of claim 1, wherein the reactive base is a metal hydride.

8. The method of claim 7, wherein the metal hydride is at least one of a NaH, a LiH, a KH, a $MgH_2$, or a $CaH_2$.

9. The method of claim 4, further comprising post functionalizing the substituent to a second substituent of FIG. 2.

10. The method of claim 1, wherein the aromatic molecule is mixed with the aprotic solvent at a temperature between about −10° C. to about 25° C.

11. The method of claim 1, wherein the mixing of the aromatic alkoxide and the fluoroelastomer is at a temperature between about 40° C. and about 60° C.

12. The method of claim 1, wherein the second mixture does not include $Li_2CO_3$, NaOH, $Na_2CO_3$, or $KHCO_3$.

13. The method of claim 1, wherein the aromatic molecule is a phenol or diethyl-4-hydroxyphenyl phosphonate.

14. The method of claim 1, wherein the fluoroelastomer is selected from the group consisting of a vinylidene difluoride polymer, a fluoroelastomer polymer with adjacent CH and CF, a polyvinylidene difluoride with a hexafluoropropylene or a tetrafluoroethylene, and combinations thereof.

15. The method of claim 1, further comprising chemically modifying the functionalized fluoropolymer with an HPA.

16. The method of claim 1, wherein a molar ratio of the reactive base to the mixture is between about 1:10 and about 1:10,000.

17. The method of claim 1, wherein a percent yield of the functionalized fluoropolymer is between about 70% and about 95%.

18. The method of claim 1, wherein a ratio of the aromatic molecule to the aprotic solvent is between about 5 g:100 ml and about 25 g:100 ml.

* * * * *